United States Patent
Qin et al.

(10) Patent No.: US 11,868,214 B1
(45) Date of Patent: Jan. 9, 2024

(54) METHODS AND SYSTEMS FOR AFFINITY AWARE CONTAINER PREFETCHING

(71) Applicant: Veritas Technologies LLC, Santa Clara, CA (US)

(72) Inventors: Yaobin Qin, Minneapolis, MN (US); Xianbo Zhang, Plymouth, MN (US)

(73) Assignee: Veritas Technologies LLC, Santa Clara, CA (US)

( * ) Notice: Subject to any disclaimer, the term of this patent is extended or adjusted under 35 U.S.C. 154(b) by 228 days.

(21) Appl. No.: 16/836,472

(22) Filed: Mar. 31, 2020

Related U.S. Application Data

(60) Provisional application No. 62/969,082, filed on Feb. 2, 2020.

(51) Int. Cl.
*G06F 11/14* (2006.01)
*G06N 20/00* (2019.01)

(52) U.S. Cl.
CPC ...... *G06F 11/1453* (2013.01); *G06F 11/1469* (2013.01); *G06N 20/00* (2019.01)

(58) Field of Classification Search
CPC .. G06F 11/1453; G06F 11/1469; G06N 20/00
See application file for complete search history.

(56) References Cited

U.S. PATENT DOCUMENTS 8,315,992 B1 * 11/2012 Gipp ............ G06F 11/1453
  711/162
8,935,446 B1   1/2015 Shilane et al.
(Continued)

FOREIGN PATENT DOCUMENTS

CN 110569245 A 12/2019
WO 2020112025 A1 6/2020

OTHER PUBLICATIONS

Zhu, Benjamin, et al., "Avoiding the Disk Bottleneck in the Data Domain Deduplication File System", USENIX Association, Fast 2008: 6th USENIX Conference on File and Storage Technologies, 2008, pp. 269-282.

(Continued)

*Primary Examiner* — Nanci N Wong
(74) *Attorney, Agent, or Firm* — Campbell Stephenson LLP

(57) ABSTRACT

Disclosed are techniques that provide for deduplication in an efficient and effective manner. For example, such methods, computer program products, and computer systems can include generating new feature information for one or more portions of a new backup image, generating first container range information by performing a container range calculation using the new feature information, generating existing feature information for one or more portions of an existing backup image, generating second container range information by performing the container range calculation using the existing feature information, determining a container range affinity between the first container range information and the second container range information, identifying at least one portion of the one or more portions of the existing backup image using a result of the determining, and prefetching the one or more fingerprints corresponding to the at least one portion of the one or more portions of the existing backup image.

20 Claims, 22 Drawing Sheets

(56) References Cited

U.S. PATENT DOCUMENTS

| | | | |
|---|---|---|---|
| 9,134,914 B1* | 9/2015 | Derbeko | G06F 3/0641 |
| 9,733,846 B1* | 8/2017 | Wigmore | G06F 3/0619 |
| 10,380,074 B1* | 8/2019 | Gu | G06F 16/1752 |
| 10,592,149 B1* | 3/2020 | Jenkins | G06F 16/1752 |
| 2010/0074439 A1 | 3/2010 | Howells et al. | |
| 2012/0303866 A1* | 11/2012 | Bandic | G11B 5/012 |
| | | | 711/112 |
| 2014/0074804 A1 | 3/2014 | Colgrove et al. | |
| 2015/0019499 A1 | 1/2015 | Aonovich | |
| 2017/0090786 A1* | 3/2017 | Parab | G06F 11/1471 |
| 2019/0310591 A1 | 10/2019 | Hazard | |
| 2021/0240377 A1* | 8/2021 | VanderSpek | G06F 3/0608 |

OTHER PUBLICATIONS

U.S. Pat. No. 103800744, dated Aug. 13, 2019, Gu et al.

\* cited by examiner

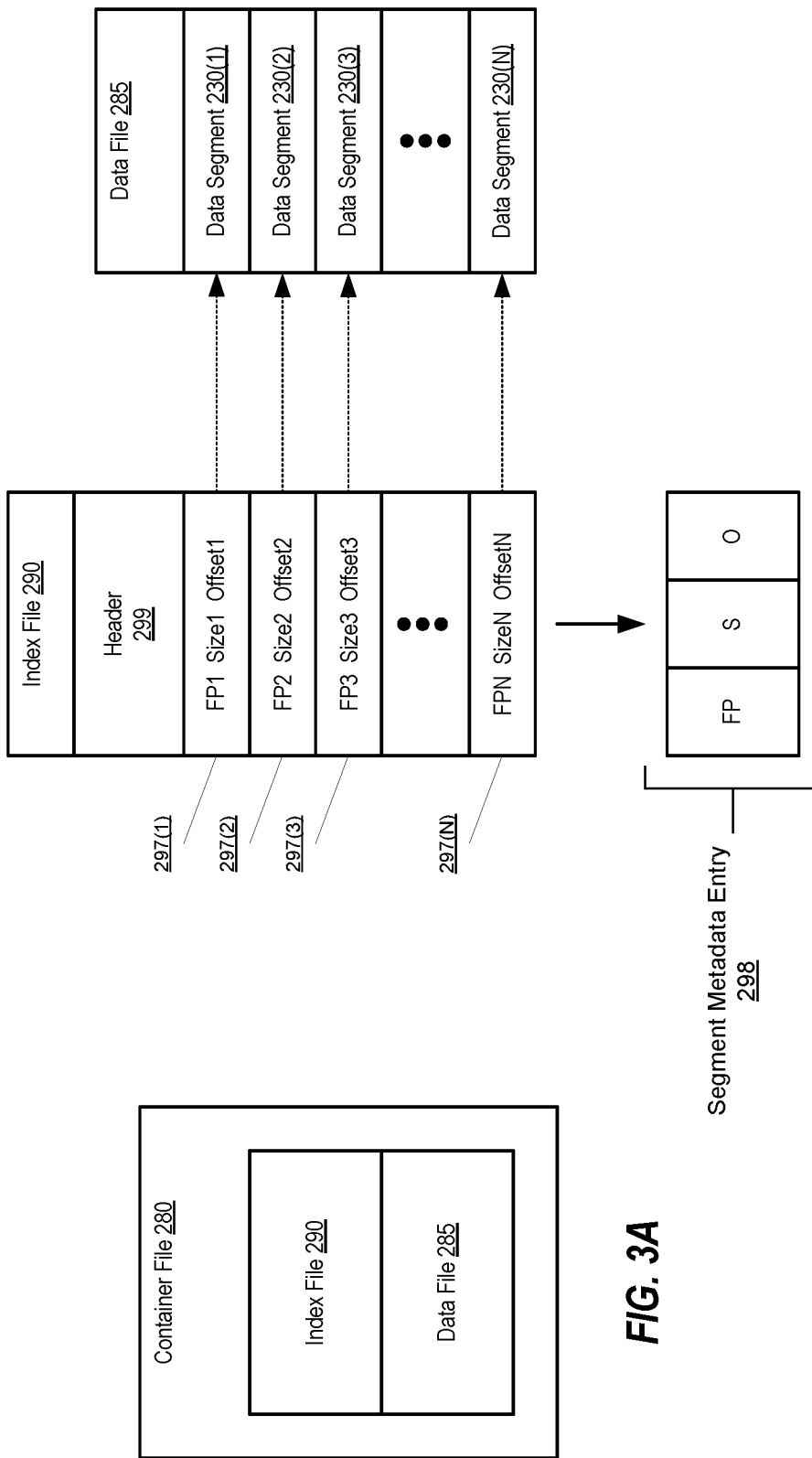

Existing Feature Information Generation Process
1200

US 11,868,214 B1

METHODS AND SYSTEMS FOR AFFINITY AWARE CONTAINER PREFETCHING

CROSS-REFERENCE TO RELATED APPLICATIONS

This application claims benefit under 35 U.S.C § 119(e) of Provisional Patent Application No. 62/969,082, filed on Feb. 2, 2020, entitled "METHODS AND SYSTEMS FOR IMPROVED DEDUPLICATION PERFORMANCE USING PREFETCHED BACKUP INFORMATION," and having Y. Qin and X. Zhang as inventors. The above-referenced application is hereby incorporated by reference herein, in its entirety and for all purposes.

FIELD OF THE INVENTION

The present invention relates to deduplication systems and, more particularly, to methods and systems for improved deduplication performance by way of affinity-aware fingerprint prefetching.

BACKGROUND

An ever-increasing reliance on information and computing systems that produce, process, distribute, and maintain such information in its various forms, continues to put great demands on techniques for providing data storage and access to that data storage. Business organizations can produce and retain large amounts of data. While data growth is not new, the pace of data growth has become more rapid, the location of data more dispersed, and linkages between data sets more complex. Data deduplication offers business organizations an opportunity to dramatically reduce an amount of storage required for data backups and other forms of data storage and to more efficiently communicate backup data to one or more backup storages sites.

Generally, a data deduplication system provides a mechanism for storing a unit of information only once. Thus, in a backup scenario, if a unit of information is stored in multiple locations within an enterprise, only one copy of that unit of information will be stored in a deduplicated backup storage volume. Similarly, if the unit of information does not change during a subsequent backup, another copy of that unit of information need not be stored, so long as that unit of information continues to be stored in the deduplicated backup storage volume. Data deduplication can also be employed outside of the backup context, thereby reducing the amount of information needing to be transferred and the active storage occupied by duplicate units of information.

SUMMARY

The present disclosure describes methods, computer program products, computer systems, and the like are disclosed that provide for improved deduplication performance using prefetched backup information, in an efficient and effective manner. Such methods, computer program products, and computer systems include generating new feature information for one or more portions of a new backup image, generating first container range information by performing a container range calculation using the new feature information, generating existing feature information for one or more portions of an existing backup image, generating second container range information by performing the container range calculation using the existing feature information, determining a container range affinity between the first container range information and the second container range information, identifying at least one portion of the one or more portions of the existing backup image using a result of the determining, and prefetching the one or more fingerprints corresponding to the at least one portion of the one or more portions of the existing backup image. The new feature information is generated as an output of a machine learning process, and the machine learning process receives the one or more portions of the new backup image as an input. The existing feature information is generated as an output of the machine learning process, and the machine learning process receives the one or more portions of the existing backup image as an input.

The foregoing is a summary and thus contains, by necessity, simplifications, generalizations, and omissions of detail; consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

Embodiments of methods and systems such as those disclosed herein may be better understood, and its numerous objects, features, and advantages made apparent to those skilled in the art by referencing the accompanying drawings.

FIG. 3A is a simplified block diagram illustrating an example of the composition of a container file, according to embodiments of methods and systems such as those disclosed herein.

FIG. 3B is a simplified block diagram illustrating an example of the composition of index file, according to embodiments of methods and systems such as those disclosed herein.

Figure 1:
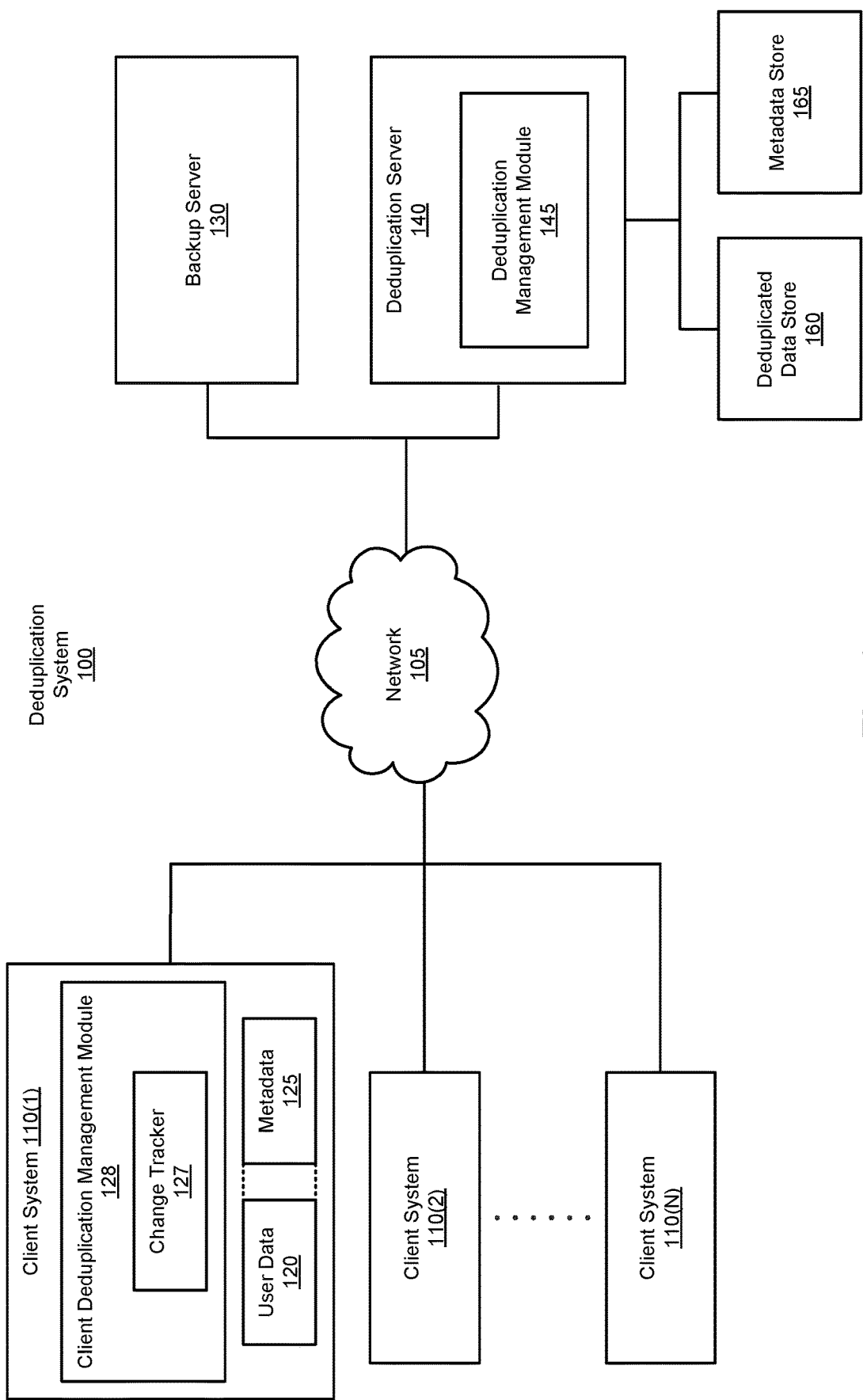
FIG. 1 is a simplified block diagram illustrating components of an example of a deduplication system, according to embodiments of methods and systems such as those disclosed herein.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

The following is intended to provide a detailed description and examples of the methods and systems of the disclosure, and should not be taken to be limiting of any inventions described herein. Rather, any number of variations may fall within the scope of the disclosure, and as defined in the claims following the description.

While the methods and systems described herein are susceptible to various modifications and alternative forms, specific embodiments are provided as examples in the drawings and detailed description. It should be understood that the drawings and detailed description are not intended to limit such disclosure to the particular form disclosed. Instead, the intention is to cover all modifications, equivalents and alternatives falling within the spirit and scope of the appended claims.

INTRODUCTION

Methods and systems such as those described herein provide for improved performance in deduplication systems by way of affinity-aware fingerprint prefetching. Broadly, the concepts described herein are applicable to the backup of data, and more particularly, to methods and systems for using affinity-aware fingerprint prefetching to, for example, improve the deduplication rate when using a new backup policy in performing deduplication.

In so doing, methods and systems such as those described herein provide flexible, efficient, and effective techniques for improved backup performance by employing machine learning techniques to analyze existing backup information, and use the results of such analysis to achieve efficient prefetching for one or more backups performed using a newly-implemented backup policy, where one or more data containers of existing backups exhibit sufficient similarity (by way of being in a range of such containers (e.g., as through the use of identifiers that identify such containers).

Certain aspects of present invention relate to deduplication systems that employ machine learning (ML; also referred to herein as artificial intelligence (AI), and including both machine learning and statistical analysis techniques) in the operation of a deduplication cache. Such embodiments provide methods and systems that improve deduplication performance through the use of affinity-aware fingerprint prefetching (e.g., for a new backup policy). Thus, in one embodiment, such methods and systems employ machine learning (ML) techniques to identify one or more patterns and learn/generate/estimate the features of the identified patterns of one or more existing backups (e.g., as for one or more units of data (e.g., data containers) of existing backups), by reducing granularity from full backup images to a smaller amount of backup information (e.g., data containers). In so doing, prefetching amounts of existing backup information less than full backup images (e.g., backup data containers) for a backup operation under a new backup policy can provide improved deduplication performance (e.g., improved deduplication rate), in such situations.

As noted, certain aspects of present invention relate to deduplication systems that employ machine learning in the operation of a deduplication cache, providing improved deduplication performance (e.g., by way of improving such systems' deduplication rate). As also noted, deduplication techniques are used in backup systems to reduce storage usage for a given amount of data. Fingerprints of data segments are used to identify data duplicates. With backend storage becoming increasingly voluminous, it becomes increasingly difficult to maintain an ever-increasing number of fingerprints cached in a deduplication system's main memory. Identifying the information that should be cached in memory in order to achieve an advantageous deduplication rate is thus a focus of certain of these embodiments. For example, with a new backup policy, when a client is to be backed up using the new backup policy and a backup starts for the client, it is advantageous to properly identify the fingerprints that should be prefetched into such a cache, preferably using a dynamic approach, in order to provide an improved deduplication performance (e.g., deduplication rate).

Thus, the present disclosure describes the application of ML and statistical techniques to identify one or more patterns and estimate/learn features of each identified pattern of existing backup images. Generally, a backup image shares very little contents with the a backup images made using different backup policies. However, such a backup images can have more contents in common with a union of multiple portions of backup images from different policies, which is the newly-added backup policy situation contemplated by the present disclosure. In so doing, methods and systems according to the present disclosure employ affinity-ware fingerprint prefetching that localizes the affine (e.g., high-affinity) portions of existing backup images (e.g., data containers) used by the backup images from different policies, then prefetches the fingerprints of those portions (e.g., data containers).

As also noted, fingerprint prefetching is a process to determine which fingerprints are to be fetched, in order to improve the deduplication performance (e.g., deduplication rate), while remaining cognizant of the limitations extant in the amount of main memory for such operations. Backup images for a particular client may exhibit relatively high temporality, thus a high deduplication rate (e.g., >90%) can be achieved when prefetching the latest images for deduplicating a new backup for the same client. Such prefetching scenarios may not provide comparable performance in situation in which a given backup image does not exhibit the same level of temporality (e.g., such as the initial backup of a client under a newly-implemented backup policy). Methods and systems such as those described herein provide for an AI-enabled deduplication cache (also referred to herein as a machine learning deduplication cache (MLDC)) to prefetch the appropriate data containers of existing backups, and so ameliorate problematic deduplication efficiency for the backup of a client when implementing a new backup policy.

Certain embodiments provide for deduplication caching approaches employing machine learning (referred to herein as machine learning deduplication caching (MLDC)), which prefetches the proper backup data (full backup images) with sufficiently high similarity, for use in deduplicating initial backups of newly added clients, based on, for example, identified backup behavior of historical backups. As noted, when implementing a new backup policy, such an approach reduces the granularity with which such approaches operate, employing, for example, an approach using data containers and ranges thereof, in order to perform prefetching.

Certain deduplication systems employ a caching policy (e.g., a Least Recently Used (LRU) policy), but such approaches often exhibit a low deduplication rate when the backups in question do not have high temporality. Another caching policy, referred to as Locality Preserved Caching (LPC), can be implemented, but also suffers from certain infirmities. The LPC technique randomly prefetch is a subset of <fingerprint, DCID> pairs for deduplication first (where DCID is a data container identifier or other such identifying information), then prefetch is fingerprints in the respective containers of the missed fingerprints. Such a technique does not provide acceptable performance for the initial backup that has low locality. Furthermore, such a technique can suffer from unacceptably high overhead, caused by an inordinately large amount of on-disk fetching (due to frequent prefetching misses).

In certain embodiments, then, an MLDC according to the methods and systems described herein includes three aspects: representation, learning, and decision making. Such is the case, without regard to the granularity at which such a system operates. The representation component provides an effective manner in which to model the backup behavior of each client/policy requiring low overhead, while providing MLDC systems with sufficient information. The learning component in such embodiments automatically learns the backup behavior of the historical backup workload of each client/policy by capturing the patterns and features from its fingerprint metadata. The learning component also estimates the backup behavior of a new backup operation by analyzing the patterns from a portion of the patterns and features of the fingerprint metadata for a (new) backup performed under a new backup policy (as will be appreciated, the backup of, for example, a client under a "new" backup policy (one that has not been used to back up that or other clients before) being, in some sense, a "new" backup), in order to identify the behavior in question. The decision making component describes techniques for determining which units of data (e.g., data containers) of existing backup images are to be prefetched by comparing the patterns and features of a backup image (or portion thereof) subject to a new backup policy and those of one or more portions of existing backup images (e.g., data containers).

Representation

In one embodiment of an MLDC, the backup behavior of each client/policy is represented by the data containers of its latest full backup's container usage, instead of the fingerprints generated. Such representation significantly reduces the complexity of the modeling of backup behavior, while identifying the data containers most relevant to the prefetching operation, based on the sample of the backup being performed under the new backup policy. The container usage of a full image can be quantified as a table with data container identifier (DCID, as noted subsequently) and a logical size, which specifies the size of fingerprints referenced. The container usage also can be visualized as a 2D scatter plot, where each data point depicts the logical size of fingerprints referenced by the DCID (e.g., in [DCID, logical size] pairs). A container usage data structure can store such information in a data structure identified by a client identifier, a policy identifier, time information, and type information.

Learning

As will be appreciated in light of the present disclosure, container usage of a (full) backup image is not randomly distributed, typically, but rather, clustered into one or more groups. Such a finding indicates that the container usage for a given backup image has relatively high locality, in terms of DCID. A machine learning approach (referred to herein as Container Usage Pattern Mining (CUPM), as might be effected by a container usage pattern analyzer (CUPA)) automatically identifies container locality and captures the features of the backup image's data.

CUPM techniques can be used to apply a data clustering algorithm to cluster the data based on the locality. For example, a density-based clustering algorithm such as density-based spatial clustering of applications with noise (DBSCAN) can be employed. Such clustering can be represented using mean values of each clustered data, while the mean value of outliers can be used to filter out such outlying data points. The outliers are typically irregularly small or large files, or files saved in isolated containers, and lack the representative weight of a pattern, and so are filtered out. CUPM can be used to automatically detect and remove such outliers, thereby enhancing the quality of the data analyzed by the MLDC.

After outlier removal and grouping of the data, CUPM can include the application of a statistical hypothesis test (e.g., a Chi-square analysis) and/or a density estimation technique (e.g., Kernel Density Estimation (KDE)) to perform learning for a generative model for each cluster of data. In one embodiment, Chi-square can be employed to select a probability density distribution that fits the clustered data, then KDE can be used to learn the features (e.g., such as mean, covariance, and bandwidth) of the selected distribution. In certain embodiments, such mean values, covariances, and sampled data from the patterns of the existing backup images are obtained by the CUPA system using the aforementioned CUPM techniques in an offline setting. More generally, in such embodiments, the feature information can also include a probability model, thus such feature information can include information such as:

Probability model (e.g., a Gaussian model, Pareto model, or the like);
    Parameters of the model (e.g., mean and covariance); and
    Sampled data.

Hence, the backup behavior of a given backup image (e.g., single full backup image) can be mathematically quantified as a sequence of generative models, $G_1$, $G_2$, $G_3$, .... CUPM can be used to automatically determine the number of generative models sufficient to represent the container usage of the backup image.

In practice, CUPM can be applied to the deduplication pool for training backup behavior generative models on latest historical full backups of each client. In order to reducing the impact on the regular backup, the training process can be executed offline, then learned models for MLDC decision making saved. Periodic training can be implemented to update the learning models of the deduplication pool (e.g., on a weekly or monthly basis).

Decision Making

An MLDC according to methods and systems described herein is intended to improve the deduplication efficiency of clients backed up using newly-implemented backup policies by prefetching data containers of existing backups with sufficiently-high similarity in terms of the container usage. For the backup created by a client under a new backup policy, information regarding what might be expected, in terms of data within the new backup image, is limited at the beginning of the backup process, particularly when using a newly-implemented backup policy. MLDC can identify the characteristics of the backup behavior through the limited information, for example, by prefetching existing backups' data containers. When more information regarding container usage is collected, as the backup process ongoing, MLDC applies CUPM to estimate the backup behavior of the given backup. MLDC can then calculate the container ranges for the backup being performed (e.g., as by a sample of its data segments) and those of existing backups' data containers, and then compare the ranges of each in making a determination as to which backups' containers will provide high (or, at least, acceptable) deduplication rates.

The backup images' data containers exhibiting affinity to the (new) backup image can then be prefetched, thereby improving deduplication performance (e.g., deduplication rate). Examples as to the amounts of data to provide acceptable accuracy when performing MLDC prefetch in certain embodiments is described subsequently.

Affinity-Aware Fingerprint Prefetching

Affinity List

While the foregoing describes, in general terms, the operation of examples of image-based prefetching approaches such as those described herein, and the machine learning techniques underpinning those approaches, the performance (e.g., in terms of deduplication rate) such prefetching approaches enjoy can be improved in scenarios in which a new backup policy is implemented. In order to improve the performance of a machine learning deduplication cache such as that described herein, the granularity of the analysis performed can be reduced to something less than that of a full backup image. Further, the index space of such a container-based approach is increased significantly over that of an image-based prefetching approach. However, such an increase can result in an increase in the computational overhead, and so time required to perform such prefetching. To reduce such impacts, a data construct such as (what is referred to herein as) an affinity list or comparable construct can be maintained to keep track of the frequency of the images prefetched as part of MLDC operations. In so doing, the backup images that were more frequently fetched can be assumed to have higher affinity with the new backup from the newly-created policy, than those less frequently fetched. Further, the prefetching space is reduced from all the containers of a given backup or backups, to those containers of the highest (or at least, acceptable) affinity backups.

Container Range

In one embodiment, each backup in the deduplication pool is protected by way of being stored in one or more of a number of containers. In one embodiment, each container stores 64 MB of data contents of the backup. In certain embodiments, a backup image is saved into data containers in relatively high locality (as opposed to being randomly distributed to different containers). Such locality is preferably maintained for deduplicating a new backup. Maintaining relatively high locality of backups helps to reduce the complexity of system management, decrease the overhead of recovery, and improves the predictability of the overall system. Hence, a prefetching algorithm according to the present disclosure is designed to obtain an acceptable deduplication rate, while maintaining relatively high container locality. Such an approach provides acceptable (or better) container ranges in terms of DCID to be fetched (e.g., data container identifiers ranging from 100 to 200, 1200 to 2000, and 5000 to 5800, for example).

Container Range Calculator (CR-Calculator)

The data containers for each backup may not be stored in a strictly continuous manner. For example, certain of the data containers might be adjacent to one another in terms of DCID (e.g., data containers with DCIDs of 100,101,102, and 103), but others might be isolated (e.g., data containers with DCIDs of 1000, 1300, 3001). The container range will be overestimated if simply using minimum and maximum value of DCID to quantify the intervals of the container identifier ranges, such as the two example ranges (such as [100, 105] and [1000,3001]). To address such issues, a container range calculator is used to quantify a container range based on a DCID numbers in a more effective manner. Given a sequence of DCID numbers, the mean and the variance of these numbers can be calculated. The lower bound and the upper bound of the container range are calculated by forwarding the mean, variance, the amount of DCID numbers, and the range control value (RCV) to the statistical confidential interval library. The higher RCV, the larger container range is returned. Each container range is quantified as lower bound (l), mean (u), and upper bound (u). Such a container range calculator gives a more effective interval of the container range. When memory is limited with respect to a large container range, decreasing the range control value used by the container range calculator (e.g., reducing the dynamic range of the container range calculator's response) can return a more effective smaller range.

Container Range Determiner (CR-Determiner)

Certain embodiments of MLDC prefetching approaches such as those described herein assume that there is some level of correlation among backups in the same policy. Such assumptions can provide improved deduplication performance by, for example, achieving an improved deduplication rate of the backup in a new client by prefetching the images with higher correlation in terms of container usage. However, such correlation can weaken as between images across different policies. In contrast, an affinity-aware prefetching approach such as that described herein assumes that a smaller unit of a new backup under a new backup policy (one or more containers of a backup in a new policy) have a significantly higher level of correlation with those of one or more backups belonging to different policies, which smaller units (e.g., data containers) can be combined in a granularity of such smaller units (e.g., as by data containers from different backups). In one embodiment, then, such data containers can be prefetched, and so provide acceptable deduplication performance (e.g., deduplication rate) when performing deduplication under the new policy.

In one embodiment, CUPM techniques employing a container range calculator are applied to historical backups, and a portion (e.g., a small fraction) of a backup scheduled to employ a new policy for obtaining their container ranges. Each backup may have multiple container ranges. A container range determiner such as that described herein is used to map the new backup's container ranges to their most affine container ranges of historical (existing) backups. The historical range that includes (or, in certain embodiments, completely contains) the container range of the new backup is considered as having priority over those with less coverage. If more than one such alternative exists, or there is no range that can satisfy the aforementioned priority condition, the affinity can be measured by the distance function:

$$\text{dist.} = (l_i - l_n)^2 + {}^*u_i - u_n)^2 + (m_i - m_n)^2$$

where l, u and m are the lower bound, upper bound and mean value of the range. As will be appreciated, a shorter distance indicates a higher affinity between two container ranges that a longer distance. Hence, the historical ranges having higher (or sufficiently high) affinity are fetched for use in deduplicating the new backup.

An example of an implementation of MLDC on a media server deduplication pool (MSDP) is described in connection with FIGS. 6, 7, and 8, subsequently. As will be discussed, a fingerprint catalog is maintained to store (or otherwise maintain) fingerprints of clients' latest backups. A CUPM technique is periodically applied to the fingerprint catalog, in order to identify and learn the patterns and features of historical backups. When a new backup policy is employed, the container usage of a small fraction (e.g., 5%) of a new backup is obtained by indexing the fingerprints in the new policy. The learning patterns and features of such a fraction of data are obtained by using such a CUPM technique. Using the aforementioned RCV for each of the sample backup and historical backups, a container range calculation unit, such as that described subsequently, generates container ranges that are input to a container range determiner, in order to identify the data containers to be prefetched.

Example Deduplication Architecture

In general terms, data deduplication is a technique for reducing the amount of storage needed to store information by dividing such information into chunks and eliminating duplicates thereof. In the deduplication of data backups, such chunks are referred to as data segments. Such data segments can be identified by a sufficiently-unique identifier of the given data segment (the sufficiency of the identifier's uniqueness being an acceptably low probability of unique data segments mapping to the same identifier). As will also be appreciated, such fingerprints can be generated by, for example, a fingerprinting algorithm, which is an algorithm that maps a data segment to a smaller data structure (e.g., of shorter length), referred to generically herein as a fingerprint. A fingerprint uniquely identifies the data segment and is typically used to avoid the transmission and comparison of the more voluminous data that such a fingerprint represents. For example, a computing system can check whether a file has been modified, by fetching only the file's fingerprint and comparing the fetched fingerprint with an existing copy. That being the case, such fingerprinting techniques can be used for data deduplication, by making a determination as to whether a given unit of data (e.g., a file, portion there of (e.g., a data segment), or the like) has already been stored. An example of a fingerprint is a hash value. Hashing algorithms such as Message-Digest Algorithm 5 (MD5), Secure Hash Algorithm 1 (SHA-1), and Secure Hash Algorithm 256 (SHA-256) and the like can be used to generate hash values for use as fingerprints.

The function of a hashing algorithm is a function that can be used to map original data of (what can be arbitrary) size onto data of a fixed size, and in so doing, produce a value (a hash value) that is unique (with a sufficiently high level of confidence) to the original data. The input data is typically referred to as the "message" and the hash value is typically referred to as the "message digest" or simply "digest."

During a backup, clients and/or other computing systems may present duplicate data within a set of data that is to be backed up. In addition, if a set of data is backed up multiple times, the data that is unchanged also results in duplicates of previously backed up data. In order to prevent backing up duplicate data from one or more clients, backup systems can implement deduplication, which removes duplicate copies of data while keeping track of how the stored unique data is being referenced. Deduplication can be used not only to preserve storage space when backing up data from client systems, but also avoids the unnecessary transfer of duplicate data.

As will also be appreciated, hardware failure is not an entirely uncommon event in today's information processing systems. Also not infrequently, the cause of such hardware failures is related to the storage systems in which such information is maintained. In light of such challenges, data protection has always been, and indeed, continues to be an important consideration in the reliable operation of such information processing systems. Traditionally, for online/operational data, different technologies (e.g., redundant array of independent disks (RAID) storage systems or mirroring/replication storage systems) have been employed to provide fault tolerance. Mirroring provides one or more full redundant copies of the data being protected, with virtually no performance impact, but suffers from a significant increase in storage consumption. Alternatives to mirroring include various levels of RAID storage systems (e.g., RAID4, RAID5, RAID6, and the like), which provide fault tolerance to a degree that is similar to that provided by mirroring storage systems.

FIG. 1 is a simplified block diagram illustrating components of an example of a deduplication system (depicted, for example, as a deduplication system 100), in which the present disclosure can be implemented. Deduplication system 100 includes a network 105 that communicatively couples one or more client systems 110(1)-(N), a backup server 130, and deduplication server 140 (includes a deduplication management module 145). Each component is discussed in further detail below.

One or more client systems 110(1)-(N), also referred to herein as client devices 110 and/or client systems 110, can be implemented using, for example, a desktop computer, a laptop computer, a workstation, a server, or the like. An example of such computing devices is described subsequently. One or more client systems 110(1)-(N) can be configured to communicate with backup server 130 and deduplication server 140 via network 105. An example of network 105, which can be used by client systems 110 to access backup server 130 and deduplication server 140, is a local area network (LAN) utilizing Ethernet, IEEE 802.11x, or some other communications protocol. While FIG. 1 illustrates client system 110(1) including user data 120 and metadata 125 (and such being associated with one another, by dotted lines), each client system can store different user data 120 and metadata 125 in storage local to the client system.

Also shown as being implemented in client system 110(1) is a change tracker (illustrated in FIG. 1 as a change tracker 127). Change tracker 127 can be implemented, for example, as part of a client deduplication management module (illustrated in FIG. 1 as a client deduplication management module 128). Moreover, change tracker 127 can be implemented, for example, as a change block tracker, detecting data (e.g., data blocks) written by, for example, an application executed by client system 110(1). Such a change block tracker can track units of storage (e.g., disk sectors, data blocks, or the like) that have been changed, for example, by the aforementioned application. Such a list of changed units of storage is referred to herein as a data object change tracking list, or more specifically, a file change tracking list (and more generically as a change tracking stream). Once identified, such changed units of storage can be transferred from the computing system in question to a backup server (e.g., backup server 130) or a deduplication server (e.g., such as deduplication server 140), for example. In certain embodiments, such changed units of storage can be sent to a proxy server, for further conveyance to the proper destination, then or at a later time. As will be appreciated in light of the present disclosure, such an implementation is presented merely as an example, and such change tracking can be performed by any computing device shown in FIG. 1 (e.g., by deduplication server 140) and/or another computing device not shown in FIG. 1.

User data 120 can include various data that is generated and/or consumed by a user of client system 110(1). User data 120 can include executable files, such as those used to implement applications and operating systems, as well as files that are used or generated by such executable files. User data 120 can include files generated by user applications (e.g., word processing programs, email programs, graphics programs, a database application, or the like) executing on client system 110(1). Some of the user data 120 may also be transferred to backup server 130 and/or deduplication server 140 via a network 105 to be included in deduplicated data store 160, and the associated metadata (e.g., metadata 125). Each of client systems 110 can send different user data and metadata to backup server 130 and/or deduplication server 140.

Metadata 125 can include data about the user data 120. Metadata 125 can be generated by client system 110(1), such as during a backup process. Whenever a user (e.g., an application or human user) requests that client system 110 add all or part of user data 120 to the deduplicated data store 160 (e.g., as part of a regularly scheduled full or partial backup of the client system), client system 110(1) can read user data 120 and metadata 125 (or generate metadata 125 about user data 120), such as one or more identifiers (also referred to herein as signatures), that can identify different portions of user data 120. Client system 110 can provide metadata 125 as a list (e.g., a list of signatures) to deduplication server 140. Metadata 125 can be used by deduplication server 140 to determine whether a portion of user data 120 is not already stored in deduplicated data store 160 (and so should be added to the deduplicated data store 160).

As noted, backup server 130 is also coupled to network 105. Backup server 130 can include one or more physical servers configured to perform a variety of tasks related to management and implementation of backup services for deduplication system 100, such as performing a full or partial backup of a client system. In deduplication system 100, backup server 130 is further configured to communicate with deduplication server 140 for purposes of storing backups of data from client systems 110(1)-(N) in resources controlled by deduplication server 140. Such communication can be via network 105 or via a direct link between the backup server 130 and deduplication server 140. Information that can be provided by backup server 130 to deduplication server 140 can include a unique identification associated with each data stream provided by one of client systems 110(1)-(N) to the deduplication server 140. The backup server 130 can also provide sequence number identification for to identify sequential data transmitted in each uniquely identified data stream. Deduplication server 140 (and more particularly, deduplication management module 145) can then use such information to associate received data streams from client systems 110(1)-(N) in accord with embodiments of the present invention, as further discussed subsequently.

Backup services can be implemented in deduplication system 100 as a client-server application (not shown), with a server component (e.g., residing in backup server 130) and a client component (e.g., residing on client systems 110) of the client-server application. A server component can be configured to communicate with a client component during a backup process. Certain functions of the backup services can be performed by the client and server components, where the functions may be divided between the two components, or may be performed completely by one component or the other, depending on the implementation of the backup application. For example, backup server 130 can be configured to perform tasks that include communicating with client systems 110 to initiate backup tasks on the clients, maintaining databases related to files and other information backed up from file systems associated with the clients, and managing or tracking resources storing backups of client systems 110.

Deduplication server 140 is also coupled to network 105 and performs a variety of tasks related to management and implementation of deduplication services for the system illustrated in FIG. 1. Deduplication server 140 can include one or more physical servers configured to perform a variety of tasks related to deduplication services, which can be managed by deduplication management module 145. For example, deduplication server 140 can provide deduplication services for eliminating duplicated data content in a backup context. Deduplication services help reduce an amount of storage needed to store backups of enterprise data (e.g., user data 120) by providing a mechanism for storing a piece of information only one time. Such storage can be managed by deduplication management module 145. Thus, in a backup context, if a piece of information is stored in multiple locations within an enterprise (e.g., on multiple client systems 110), that piece of information will only be stored one time in a deduplicated backup storage area, such as deduplicated data store 160. Also, if the piece of information does not change between a first backup and a second backup, then that piece of information will not be stored during the second backup as long as that piece of information continues to be stored in the deduplicated backup storage area. Data deduplication can also be employed outside of the backup context, thereby reducing the amount of active storage occupied by duplicated files.

Deduplication services can be implemented in the deduplication system 100 as a client-server application (not shown), with a server component (e.g., residing on deduplication server 140) and a client component (e.g., residing on client systems 110) of the client-server application. For example, during a backup process for storing a backup of user data 120 in deduplicated data store 160, a client component of the deduplication services can be configured to generate metadata 125 about user data 120, such as one or more identifiers, or signatures, that can identify different portions of user data 120, and to communicate metadata 125 to a server component, which is discussed further below. Certain functions of the deduplication services can be performed by the client and server components, where the functions may be divided between the two components, or may be performed completely by one component or the other, depending on the implementation of the backup application.

Deduplication server 140 is in turn coupled to network storage for deduplicated data that includes a deduplicated data store 160 and a metadata store 165. Deduplicated data store 160 is a storage area in which deduplicated data can be stored. Deduplicated data store 160 can be configured as single instance storage. In single instance storage, only a single instance of a piece of data is stored. A common use of single instance storage is for maintaining data backups for servers and other computing clients in a network. For each backup, only a single instance of information duplicated in deduplication system 100 will be stored in the single instance storage area. In addition, for subsequent backups occurring over time, data items that have not changed from one backup to another need not be stored in the subsequent backup. In this manner, significant savings in data storage space can be realized by eliminating duplicated data content.

Metadata store 165 is a storage area that includes various metadata regarding the deduplicated data stored in deduplicated data store 160, such as information regarding backups stored in deduplicated data store 160 (also referred to herein as a catalog), including, in certain embodiments, references to the files included in a given backup. It is these references (e.g., file references) to which methods and systems such as those described herein are directed, with regard to improving the efficiency with which such references are managed. That being the case, metadata store 165 is configured with data constructs and structures, such as those described subsequently herein, in order to facilitate performance of processes such as those also described subsequently herein.

The various metadata (including metadata 125) can be stored in, among other locations, a central index. For example, deduplication server 140 can use metadata 125, such as the list of signatures from client systems 110, to determine if portions of a backup (e.g., portions of user data 120) are non-duplicative of portions already stored in deduplicated data store 160. Once deduplication server 140 determines that a portion of user data 120 is not duplicative of the data already stored in deduplicated data store 160 and thus should be added to the deduplicated data store 160, deduplication server 140 can store a corresponding identifier, or signature, of the portion of user data 120 in the central index. Deduplication server can request the non-duplicative portions (or unique portions) from client systems 110 by identifying the unique portion with the portion's associated signature.

As the unique portions are received via a data stream from client systems 110, the unique portions can be written into a fixed-size container (e.g., also referred to herein as a container file, and includes these and/or other storage construct) stored at deduplication server 140, such as in a cache or other storage unit. Once the container is full of unique data segments, in certain embodiments, the entire container can be written to a location in deduplicated data store 160. The container written to the deduplicated data store 160 can also include a local container index, which indicates a local location of each unique portion stored within the container. The local container index can include a signature associated with each unique segment stored in the container, or alternatively can include a shortened version of the signature of each unique segment stored in the container. Deduplication server 140 can maintain information identifying a container (e.g., a container identifier (a "container ID") of the container, also referred to as a data container identifier (DCID)) in a central index as a location for each unique portion in the container. The signature of a unique portion can also be associated with the location of the unique portion in an entry of the central index, where the central index includes an entry for each portion stored in the deduplicated data store 160. Thus, an identification of a portion's location, or a container ID, can be found in the central index by using the signature of the portion as a key in the central index. The location of the portion within the container identified by the container ID can be found in the local container index of the container by using at least a part of the signature as a key in the local container index.

Multiple backups can be stored in the deduplicated data store 160. For example, a first backup can be captured from user data 120 and can be stored in deduplicated data store 160. A subsequent backup captured from user data 120 can include duplicate portions that are identical to portions of the first backup already stored in deduplicated data store 160 and can include unique portions that are not identical to portions of the first backup (e.g., portions that correspond to changed user data 120). The unique portions of the subsequent backup can be written to deduplicated data store 160, while the duplicate portions will not be written (since the duplicate portions are identical to instances of portions already stored in deduplicated data store 160). Since only single instances of portions of a backup are stored in deduplicated data store 160, metadata store 165 can provide a mapping of a backup to the various non-duplicative portions stored in deduplicated data store 160 that compose the backup. Thus, a single backup can be associated with multiple portions stored throughout the deduplicated data store 160, and multiple backups can be associated with a single portion (e.g., the multiple backups share the single portion). For example, the subsequent backup can be associated with unique portions of the subsequent backup that were written to deduplicated data store 160 and with unique portions of the first backup that were previously written to the deduplicated data store 160. Metadata store 165 can store associations between a backup and the portions that compose the backup as a group of references or pointers, where each reference indicates an entry of the central index that corresponds to a portion included in the backup.

As additional backups are added to deduplicated data store 160, backup data can become fragmented across deduplicated data store 160 as portions of changed user data 120 are stored. Thus, a recent backup stored in deduplicated data store 160 may include portions of recently changed user data 120 contiguously located in deduplicated data store 160, and may include multiple references to previously changed user data associated with older backups, which are stored in various non-contiguous locations throughout deduplicated data store 160. If a user were to restore the recent backup from deduplicated data store 160, deduplication server 140 would have to read numerous portions of data associated with older backups from across the various locations (e.g., various containers) in deduplicated data store 160. Thus, as a backup becomes more fragmented, restoration of the backup can become more inefficient due to the increasing amount of time spent on performing a growing number of access operations needed to read each portion of data of the backup from various locations in deduplicated data store 160 (e.g., determining a location for each of the multiple portions from metadata store 165).

Deduplicated data store 160 and metadata store 165 can be stored in network storage. Network storage can be implemented as network attached storage (NAS), file servers, storage filers, and/or network shares. Network storage can be implemented as a single storage device or as a collection of storage devices. Network storage can also be implemented as a storage area network (SAN), which couples remote storage devices to a server (e.g., a storage server), such that the remote storage devices appear as locally-attached storage devices to the server's operating system (OS), for example. Network storage can include a data volume.

In light of the present disclosure, it will be appreciated that network storage can be implemented by any type of computer-readable storage medium, including, but not limited to, internal or external hard disk drives (HDD), optical drives (e.g., CD-R, CD-RW, DVD-R, DVD-RW, and the like), SSD and/or FLASH memory drives (e.g., USB memory sticks and the like), tape drives, removable storage in a robot or standalone drive, and the like. Alternatively, it will also be appreciated that, in light of the present disclosure, deduplication system 100 and network 105 can include other components such as routers, firewalls and the like that are not germane to the discussion of the present disclosure and will not be discussed further herein. It will also be appreciated that other configurations are possible. For example, client systems 110 can be directly coupled to deduplicated data store 160 and/or metadata store 170, and so on.

The letter N is used to indicate a variable number of devices or components. For example, a variable number of clients are implemented in the deduplication system. Although the letter N is used in describing a variable number of instances of each of these different devices and components, a repeated use of the letter N does not necessarily indicate that each device and component has a same number of N instances implemented in the deduplication system.

Figure 2A:
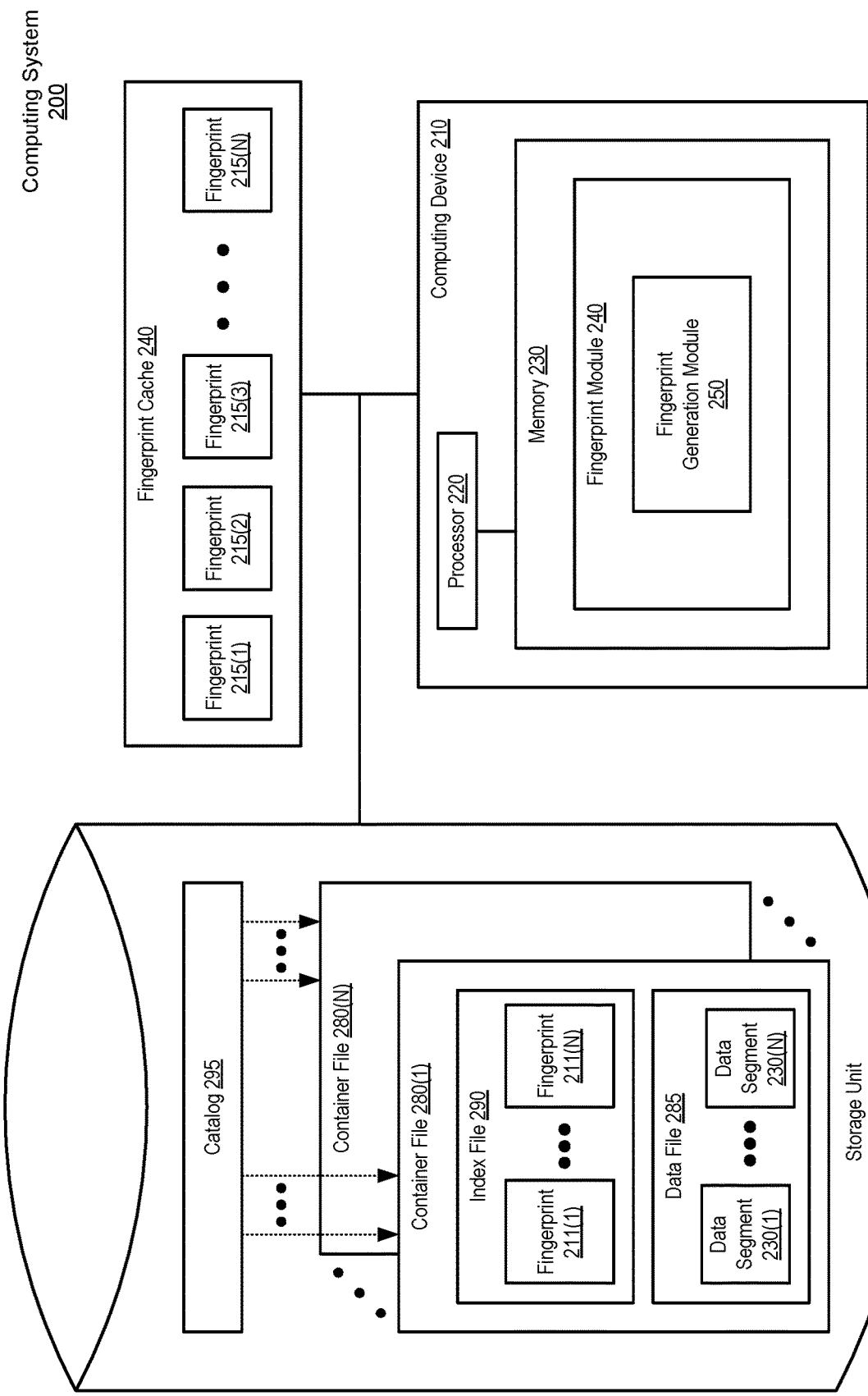
FIG. 2A is a simplified block diagram illustrating components of a computing system supporting deduplication, according to embodiments of methods and systems such as those disclosed herein.
Figure 2B:
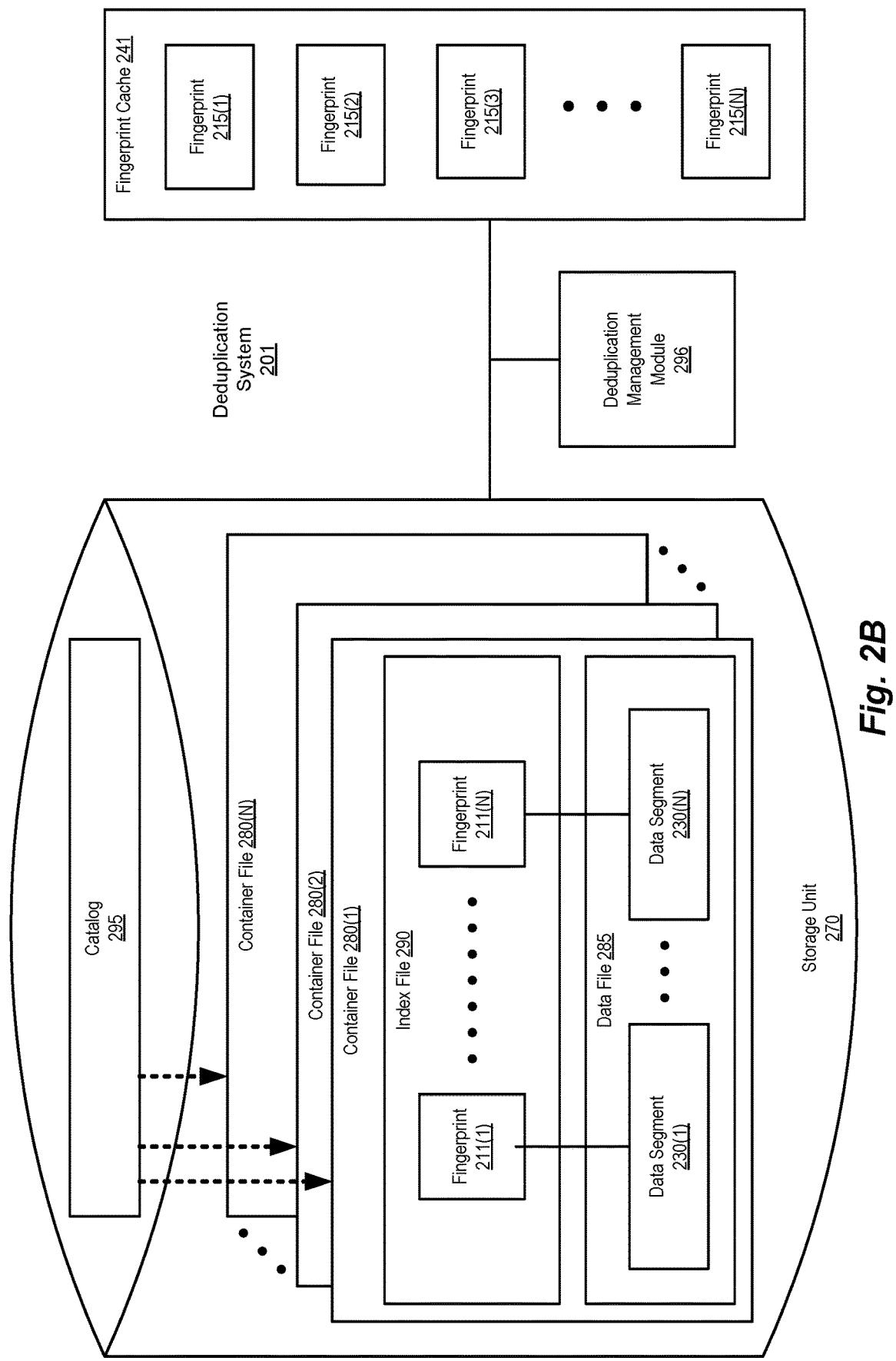
FIG. 2B is a block diagram of a computing system that stores multiple fingerprints and their associated data segments in a container file, according to embodiments of methods and systems such as those disclosed herein.

FIG. 2A is a block diagram of a computing system (which can be a client computing system or a server computing system, and which is depicted in FIG. 2A as a computing system 200; a deduplication system 201 is therefore depicted in FIG. 2B). Computing system 200 includes a computing device 210, a storage unit 270, and a fingerprint cache 240. As will be appreciated in light of the present disclosure, a fingerprint cache such as fingerprint cache 240, in certain embodiments, facilitates a determination as to whether data represented by a given fingerprint is stored in the system, as well as facilitating the identification of the container file in which the data in question (i.e., that represented by the given fingerprint) is stored. As shown, computing device 210 is communicatively coupled to storage unit 270 and fingerprint cache 240. Computing device 210 can be implemented using one or more of a variety of different types of computing devices, including a server, personal computing device, laptop computer, net book, personal digital assistant, cellular phone, or the like. It is noted that this is a simplified example, and that other embodiments can include far more complex organizational and configuration schemes than are shown here.

Computing device 210 includes a processor 220, and memory 230. Computing device 210 also includes a fingerprint module 240 which implements a fingerprint generation module 250. Fingerprint generation module 250 generates new fingerprints for a given data segment by implementing, for example, a fingerprint generation routine that generates a hash value corresponding to the given data segment. In this example, fingerprint generation module 250 implements a routine that uses a fingerprinting algorithm to generate a fingerprint (hash value).

Storage unit 270 stores a number of container files (e.g., such as one of container files 280(1)-(N), referred to herein for the sake of simplicity as container file 280, as an example of a container file and/or other such storage constructs) which includes a data file 285 and an index file 290. In this example, index file 290 stores fingerprints (e.g., fingerprints 211(1)-(N)) and data file 285 stores data segments (e.g., data segments 230(1)-(N)). Fingerprint cache 240 is a dedicated cache for storing fingerprints (depicted in FIG. 2A as fingerprints 215(1)-(N)). As will be appreciated in light of the present disclosure, the fingerprints stored in fingerprint cache 240 can represent data objects generally (e.g., data storage constructs such as files and the like).

Computing device 210 is coupled to storage unit 270. In this example, storage 270 stores container file 280, but can also store data (not shown) in addition to container file 280, and can do so using other formats. Storage 270 can be a persistent storage device and can include one or more of a variety of different storage devices, including hard disks, compact discs, digital versatile discs, solid state drives (SSDs; e.g., FLASH memory), and the like, or one or more logical storage devices such as volumes implemented on one or more such physical storage devices.

Computing device 210 is also coupled to a fingerprint cache 240. In this example, fingerprint cache 240 can be main memory, an SSD, or even a file, and implements a cache such that data (e.g., frequently accessed fingerprints) can be served to computing device 210 in an expeditious manner to determine the existence of a given fingerprint and where the data represented by that fingerprint is stored, versus, for example, from a slower storage device (e.g., a hard disk drive (HDD)). However, fingerprint cache 240 can be implemented on one or more of a variety of different storage devices, including hard disks, compact discs, digital versatile discs, and the like, or on one or more logical storage devices such as volumes implemented on one or more such physical storage devices.

Computing device 210, storage unit 270, and fingerprint cache 240 can be integrated (e.g., where the storage device is coupled to the node's internal processing devices by an internal bus and is built within the same chassis as the rest of the node) or separate. If separate, computing device 210, storage unit 270, and fingerprint cache 240 can be coupled by a local connection or via one or more networks (e.g., local area networks (LANs) and/or wide area networks (WANs) (not shown)).

FIG. 2B is a block diagram of a computing system that stores multiple fingerprints and their associated data segments in a container file. In such a deduplication backup system (depicted in FIG. 2B as deduplication system 201), data storage constructs such as data segments (e.g., data segments 230(1)-(N)) are depicted as being stored in a data file (e.g., such as data file 285) of container file 280(1). Each container file includes an index file (e.g., such as index file 290) and a data file (e.g., such as data file 285). In this example, index file 290 stores fingerprints 211(1)-(N) and data file 285 stores data segments 230(1)-(N). In the embodiment depicted in FIG. 2B, each of fingerprints 211(1)-(N) corresponds to a corresponding one of data segments 230(1)-(N). Also as shown in FIG. 2B, fingerprint cache 241 stores fingerprints 215(1)-(N). For example, after data segments and their associated fingerprints are stored in a container file 280, fingerprint cache 241 can be maintained to indicate that the data segment in question is stored in a container file 280 (and so is a duplicate).

As before, fingerprints 215(1)-(N) represents data storage constructs generally (e.g., the aforementioned data segments, and/or files or the like). In a deduplication backup systems that implement fingerprints, an index file can be employed to separately record fingerprint information, data segment location, and data segment size for each unique fingerprint associated with a data segment (e.g., <fp1, size1, offset1>, <fp2, size2, offset2>, and so on, as described, for example, in connection with FIG. 3B, subsequently). Also, the index file may include other information about the data segments, including (but not limited to) information indicating whether the data segment is compressed, encrypted, and/or has other such characteristics that may need to be taken into account when accessing that data segment.

Deduplication system 201 can include, for example, a deduplication management module 296 to manage various of the aforementioned information. For example, deduplication management module 296 can manage insertion of fingerprints in index file 290, data segments in data file 285, storage of fingerprints in fingerprint cache 241, and references and other information in catalog 295. Further in this regard, deduplication management module 296 can perform or cause to be performed deduplication management operations such as those described elsewhere herein.

FIG. 3A is a simplified block diagram illustrating an example of the composition of container file 280, which, according to one or more embodiments, allows a backup operation to reference multiple fingerprints representing the data segments that make up a given data construct, such as a file. At the beginning of an initial backup operation, new data segments are written into the given container files (e.g., a container such as container file 280). At the end of the initial backup operation, a data object is stored in the newly-created container file. The data object can contain, for example, the following information: <fp1, size1, containerID1>, <fp2, size2, containerID2>, and so on. A data object typically corresponds to a backup that includes the data segments to be backed up during a full or incremental backup operation. As will be also appreciated in light of the present disclosure, a data object may be represented by a fingerprint that is the hash value of the data object content.

According to one embodiment, at the beginning of a backup operation from the same client and/or backup policy that performed and/or requested the initial backup operation, data objects that include fingerprints of the last full backup operation (in this example, the initial backup operation) can be retrieved from container file 280. Data segments (or other data storage constructs, as noted) in the new backup operation are fingerprinted (e.g., using fingerprint generation module 250) and looked up within fingerprints from the last full backup operation (e.g., fingerprints 215(1)-(N) in fingerprint cache 240).

If a given fingerprint is not among fingerprints 215(1)-(N) in fingerprint cache 240, a "cache miss" has occurred, and such as indicated (thereby indicating that one or more fingerprints thus generated were not present in the last full backup operation). That being the case, such fingerprints are looked up in a fingerprint index cache, which, in certain embodiments, is a centralized fingerprint index cache such as that depicted in connection with FIG. 2B. In certain embodiments, if the fingerprints are not found in such a central fingerprint index cache, the fingerprints are inserted into the central fingerprint index cache. Future backup operations can then reference fingerprints from both the last full backup operation (e.g., an initial backup operation) and the new backup operation.

In some embodiments, such a central fingerprint index cache is maintained by a deduplication server. In such a scenario, the central fingerprint index cache includes at least part of the entire set of fingerprints that exist in the deduplication system and includes fingerprints generated by a fingerprinting algorithm such as that described previously herein. Although future backup operations can reference fingerprints from the previous backup operations, the central fingerprint index cache will typically not maintain copies of all the fingerprints making up fingerprints 215(1)-(N) because, in this example, fingerprint cache 240 is implemented on an SSD. While such an implementation provides faster fingerprint retrieval and lookup functions, such a storage technology does not typically provide enough storage to store all the fingerprints associated with the various data segments in the previous backups. Therefore, index file 290 is needed, to ensure that future backup operations can reference index file 290 (rather than having to store all such fingerprints in fingerprint cache 240).

FIG. 3B is a simplified block diagram illustrating an example of the composition of index file 290 and data file 285, according to one or more embodiments. That being the case, index file 290 can be seen to include a number of metadata entries (depicted in FIG. 3B as metadata entries 297(1)-(N), and referred to in the aggregate as metadata entries 297), which, in turn, include: <FP1, size1, offset1>, <FP2, size2, offset2>, and so on, where FP1 represents fingerprint 211(1), FP2 represents fingerprint 211(2), and so on. Metadata entries 297 are shown in an example as a segment metadata entry 298, which includes a fingerprint, a data segment size, and a data segment offset within data file 285. While metadata entries 297 are depicted as including such information, additional information (e.g., compression/encryption flags, a checksum, other data references, and/or other relevant information pertinent to the data stored in data file 285). Index file 290 also includes a header 299, which can be used to maintain information regarding the aforementioned metadata entries. As is shown in FIG. 3B, the size and offset information, associated with each of the fingerprints, serves as an index to a data segment in data file 285 to which the given fingerprint corresponds.

In some embodiments, index file 290 includes a number of data object records, each of which may include, in addition to the foregoing, a unique identifier (UID) list, which may list one or more UIDs of file records in catalog 295, as described subsequently in connection with FIG. 4. When a file's data is to be inserted in the catalog (e.g., as part of a backup operation), a file record is created with a UID for the file and fingerprint for the data of the file. In such embodiments, the given UID can be inserted into the data object record that has the data fingerprint in question (i.e., the fingerprint of the data object storing some or all of the file data of the inserted file). When a file record is removed (e.g., in response to a request from a source computer), the UID of that file record is also removed from the corresponding data object record. Thus, in such embodiments, the UID list of a data object record uniquely identifies each file to which file data corresponds.

Figure 3C:
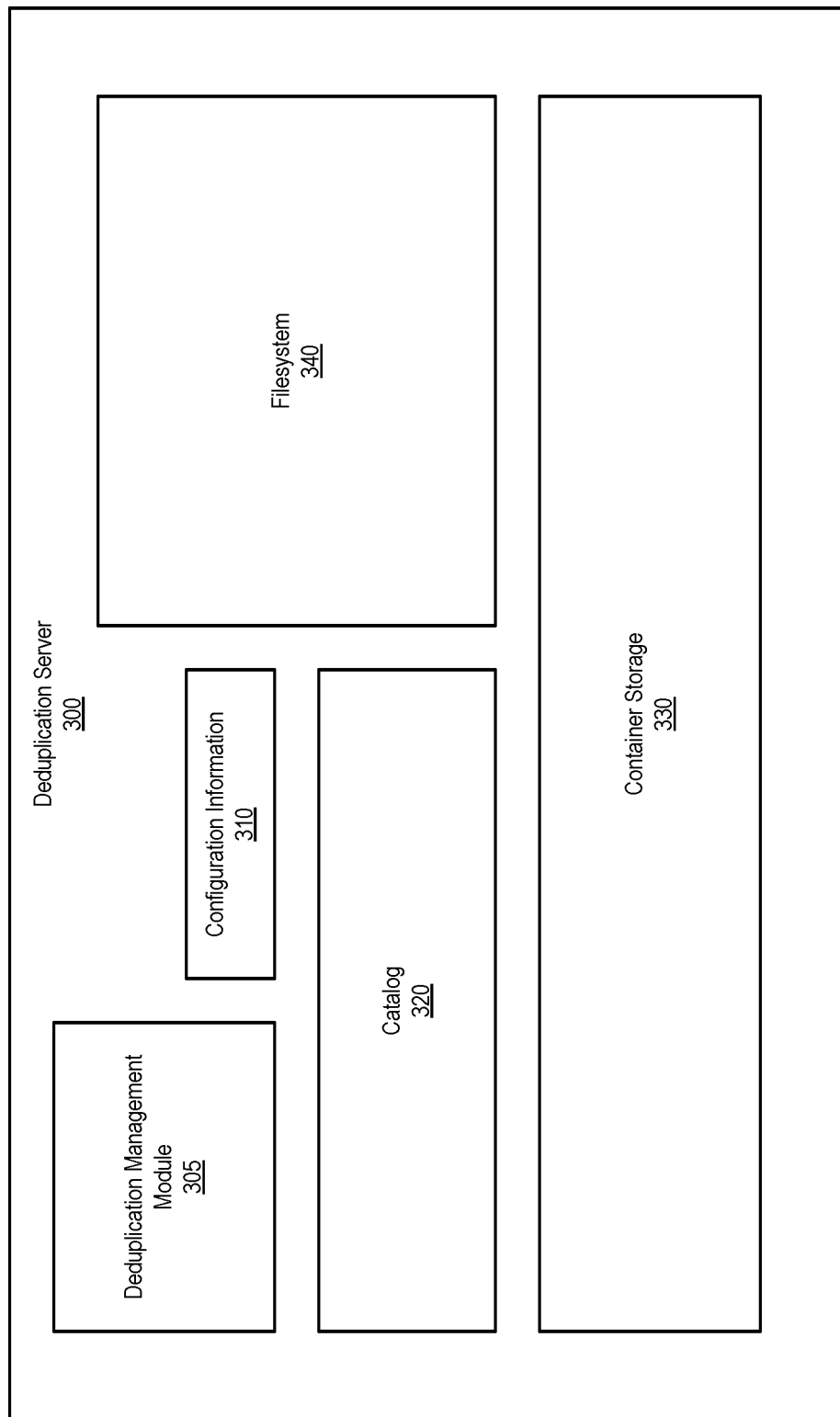
FIG. 3C is a simplified block diagram illustrating an example of a deduplication system, according to embodiments of methods and systems such as those disclosed herein.

FIG. 3C is a simplified block diagram illustrating an example of a deduplication system that provides a user-accessible storage area, according to methods and systems such as those described herein. That being the case, FIG. 3C depicts one embodiment of a deduplication server 300, in the manner of deduplication server 140 of FIG. 1. Deduplication server 300 includes a deduplication management module 305 (e.g., in the manner of deduplication management module 296, described earlier in connection with FIG. 2B), which manages and maintains a variety of information, including, in the depicted embodiment, configuration information 310, catalog information 320 (in the manner of catalog 295 described previously), and container storage 330 (in the manner of containers 280 described previously). In the embodiment depicted in FIG. 3C, deduplication server 300 also supports a file system 340. Despite existing in the storage of deduplication server 300, file system 340 can be accessed from other computing systems (e.g., client systems 110), by users of such other computing systems, in the manner of file systems local to those computing systems. Such can be accomplished using, for example, protocols such as NETWORK FILE SYSTEM (NFS), SERVER MESSAGE BLOCK (SMB), COMMON INTERNET FILE SYSTEM (CIFS), or the like.

Figure 4:
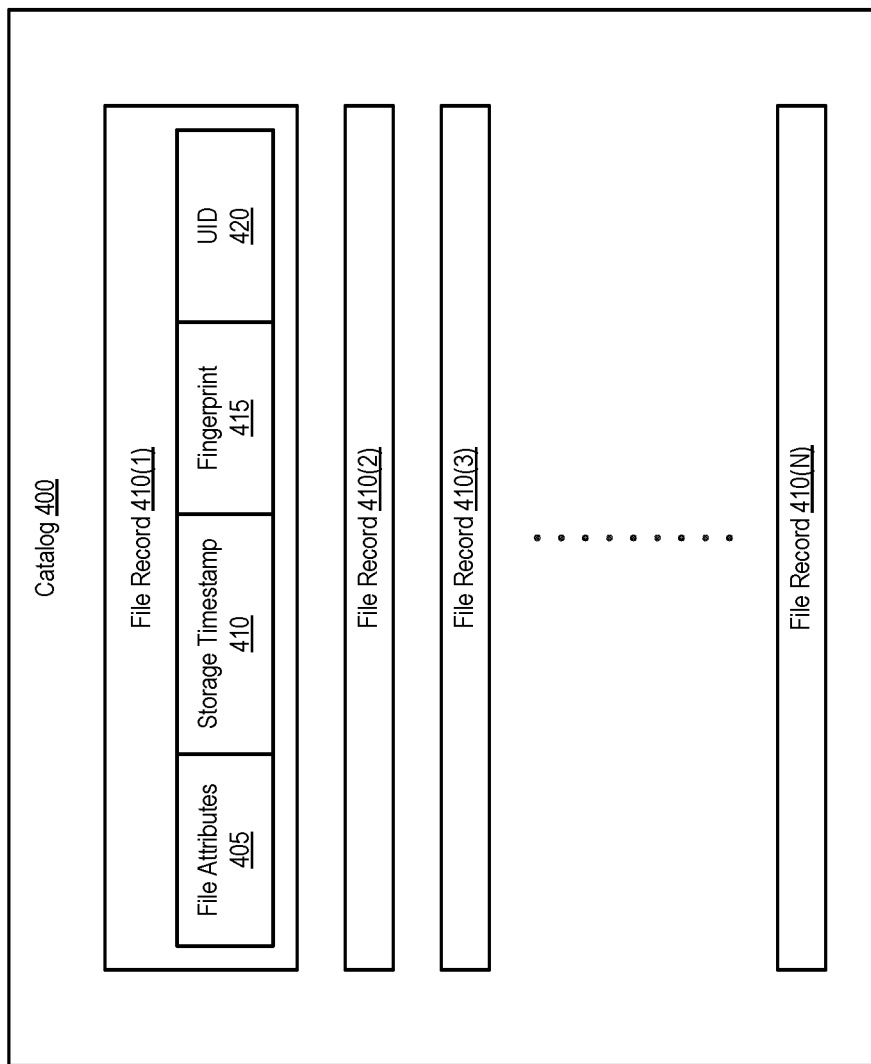
FIG. 4 is a simplified block diagram illustrating an example of a file record, according to embodiments of methods and systems such as those disclosed herein.

FIG. 4 is a simplified block diagram illustrating an example of a catalog, according to embodiments of methods and systems such as those disclosed herein. According to the illustrated embodiment, one or more file records can be stored in a catalog such as catalog 295 (a comparable construct being illustrated in FIG. 4 as a catalog 400), and is illustrated in FIG. 4 as being among a number of such file records (depicted in FIG. 4 as file records 410(1)-(N), or in their entirety, as file records 410). Using file record 410(1) as an example, it can be seen that FIG. 4 depicts file record 410(1) as including one or more file attributes 405, a storage timestamp 410, a fingerprint 415, and a unique identifier (UID) 420. In various embodiments, a file record may include fewer and/or additional details and/or various other pieces of information.

In certain embodiments, file attributes 405 includes a number of attributes of the corresponding file (e.g., filename, path, size, owner, modification/access history, permissions, and so on, as relates to the file in question). Storage timestamp 410 may include an indication of when the file record was created or last updated, for example. In certain embodiments, data fingerprint 415 includes fingerprint information that effectively uniquely identifies the data in the corresponding file, such that two files with the same data portion will have the same data fingerprint and two files with different data portions will have different fingerprints. For example, the data fingerprint may be derived by applying one or more hash functions to the data portion of the corresponding file, as noted earlier. Various other methods for calculating data fingerprints can be used to calculate data fingerprints, as also noted earlier. According to the illustrated embodiment, file record 410(1) also includes unique identifier (UID) 420 for the corresponding file. UID 420 may uniquely identify the file corresponding to file record 410(1) using various techniques, including those described in connection with the generation of fingerprints such as those associated with the data segments described elsewhere herein. In certain embodiments, catalog 400 includes a path object (PO, as noted) corresponding to each data object group in the catalog.

Figure 5A:
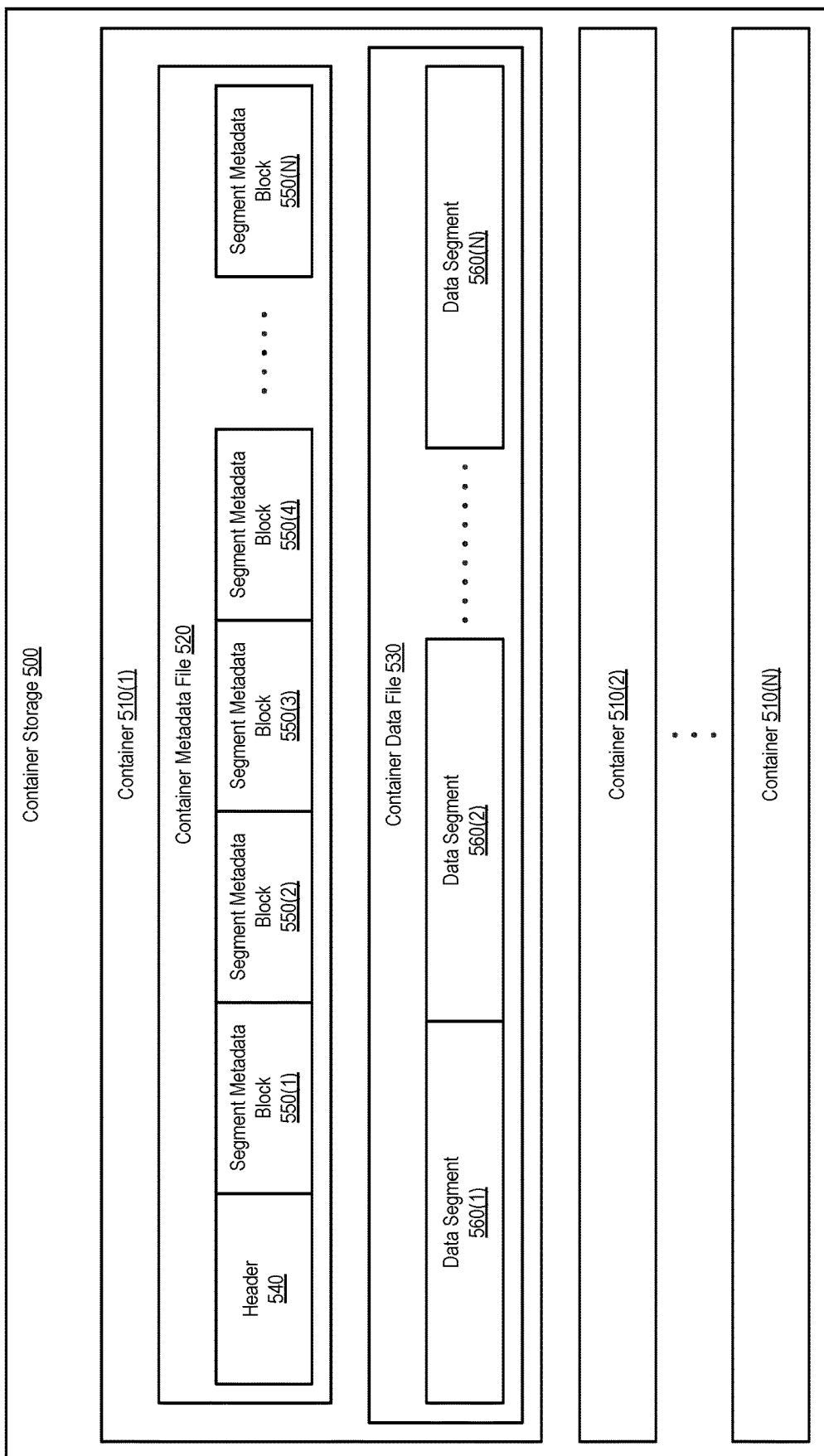
FIG. 5A is a simplified block diagram illustrating an example of container storage and containers therein, according to methods and systems such as those described herein.

FIG. 5A is a simplified block diagram illustrating an example of container storage, according to methods and systems such as those described herein. FIG. 5A thus depicts an example of container storage 330 as container storage 500 and, in so doing, provides greater detail as to the information stored therein. Container storage 500 provides for the storage of a number of containers (depicted in FIG. 5A as containers 510(1)-(N), and referred to in the aggregate as containers 510). While container storage 500 is depicted in FIG. 5A in a conceptual manner, in one embodiment, each of containers 510 can be implemented as one or more files in a file system such as those noted previously herein. Further detail is provided in connection with container 510(1). Container 510(1) is depicted as including a container metadata file 520 and a container data file 530. Container metadata file 520, in turn, includes a header 540 and some number of segment metadata blocks (depicted in FIG. 5A as segment metadata blocks 550(1)-(N), and referred to in the aggregate as segment metadata blocks 550). As will be appreciated in light of the present disclosure, segment metadata blocks 550 are comparable in content and structure to metadata entries 297(1)-(N), and are intended to be interchangeable therewith. Container data file 530 includes a number of data segments (depicted in FIG. 5A as data segments 560(1)-(N), and referred to in the aggregate as data segments 560).

Figure 5B:
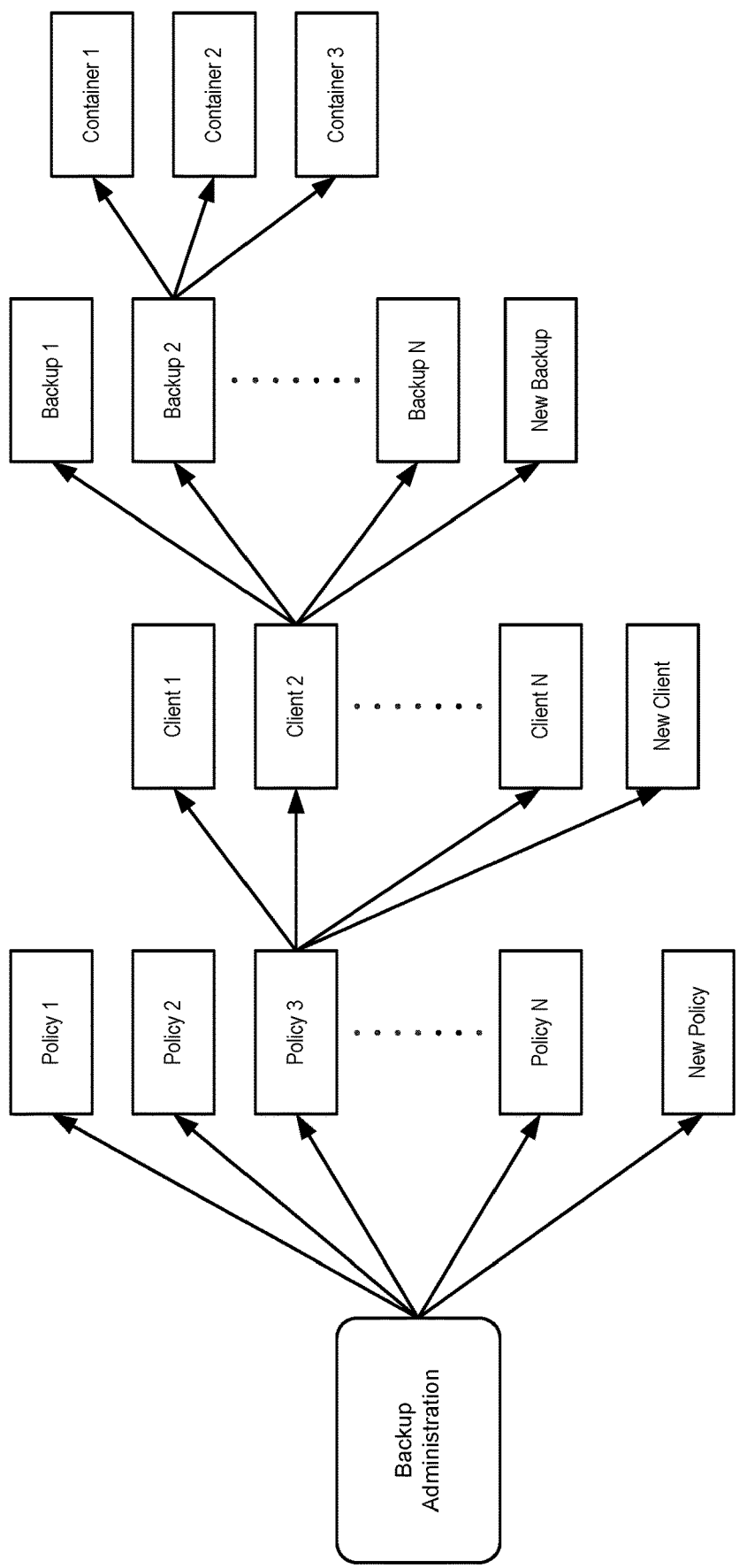
FIG. 5B is a simplified block diagram illustrating an example of relationships between backup policies, clients, backup images, and data containers, according to methods and systems such as those described herein.

FIG. 5B is a simplified block diagram illustrating an example of relationships between backup policies, clients, backup images, and data containers, according to methods and systems such as those described herein. The backup content correlation among backups protected by client-policy backup systems is illustrated in FIG. 5B. The correlation can be generalized from actual datasets and used as a guide for proposing affinity-aware fingerprint prefetching approaches such as those described herein. A deduplication system such as that contemplated by the methods and systems described herein use the client-policy infrastructure to manage backups, as shown in FIG. 5B Backup administrators typically creates multiple policies based on different backup types and different agreed-upon service levels. A single policy can protect multiple clients, and the clients in a policy typically share the same backup frequency. A new full or new incremental backup is scheduled based on the configuration of backup frequency. Due to the different characteristics of full and incremental backups, the incremental backups generally have much lower redundancy than do full backups. Methods and systems such as those described herein, in certain embodiments, only consider the full backups, and so the term "backup" refers to a full backup. Duplicates in the backup stream are identified and eliminated (e.g., as noted), and then the unique data segments are saved to the containers in a log fashion to preserve their locality. As a result of such deduplication operations, the data containers may be shared by several backups.

Example Deduplication Systems Employing Machine Learning Techniques

Figure 6:
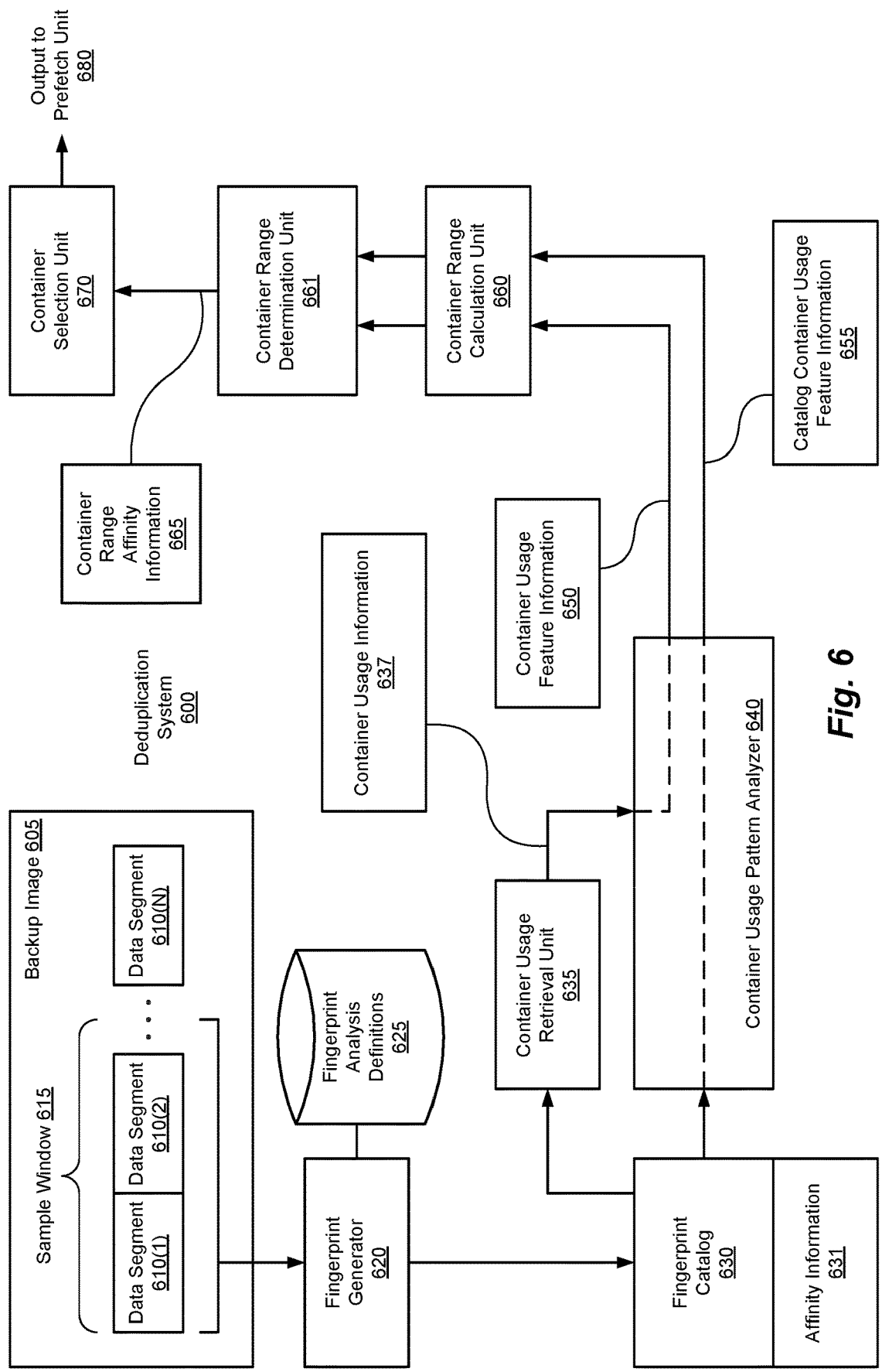
FIG. 6 is a simplified block diagram illustrating an example of a deduplication system, according to methods and systems such as those described herein.

FIG. 6 is a simplified block diagram illustrating an example of a deduplication system, according to methods and systems such as those described herein. FIG. 6 thus depicts a deduplication system 600 in which a new backup (depicted in FIG. 6 as a backup 605) is processed according to certain embodiments. Deduplication system 600 depicts an overall architecture of one example implementation of affinity-aware fingerprint prefetching. As noted, a fingerprint catalog is maintained to hold fingerprints of existing backups (e.g., the system's clients' latest backups). The CUPA is periodically (e.g., on weekly or monthly basis) applied to the fingerprint catalog to identify and learn the patterns and features of the historical backups (existing backup information). When a new backup of a newly created policy is scheduled, the container usage of a small fraction of the new backup (e.g., 5%) is obtained by indexing the fingerprints in the same policy type from the fingerprint catalog. In such an embodiment, the container ranges of the new backup and the historical backups with highest affinity such as top 50% are acquired by applying CUPM techniques and container range calculation/determination. Since a small sample window is configured for the new backup to obtain the container usage information, a large RCV is configured for the new backup to obtain a large effective range. The RCV for the historical container range is determined, in certain embodiments, based on parameters such as the amount of memory available. Containers in the most (or sufficiently) affine container ranges obtained by such container range processing are prefetched for deduplicating the new backup.

Processing of backup 605 begins with dividing backup 605 into a number of data segments (depicted as data segments 610(1)-(N), and referred to in the aggregate as data segments 610). Some number of data segments 610 are used as a representative sample of the data in backup 605. These ones of data segments 610 are selected based on a sample window 615. The data segments in sample window 615 are sent to a fingerprint generator 620, which generates fingerprints using one or more fingerprint analysis definitions (depicted as fingerprint analysis definitions 625), in the manner described in connection with FIGS. 1-5.

The fingerprints generated by fingerprint generator 620 are used to identify one or more containers in a fingerprint catalog 630. Also stored is affinity information 631. Storage and maintenance of such information allows a container usage retrieval unit 635 to retrieve data container usage information (depicted as container usage information 637), and provide such data container usage information to a container usage pattern analyzer 640.

An example of the information included in fingerprint catalog 630 (also referred to as container range information) is shown in Table 1A.

TABLE 1A

An example of fingerprint catalog information.

| BID | ... |
|---|---|
| FP | ... |
| DCID | ... |
| Size | ... |

An example of the information included in affinity information 631 is shown as an affinity list in Table 1B.

TABLE 1B

An example of affinity information.

| BID | Affinity |
|---|---|
| B1 | 10 |
| B2 | 8 |
| B3 | 6 |
| ... | ... |
| BN | ... |

An example of the information included in backup container usage information 637 (also referred to as container range information) is shown in Table 1C.

TABLE 1C

An example of backup container usage information.

| BID | DCID |
|---|---|
| ... | ... |
| ... | ... |
| ... | ... |

Container usage pattern analyzer 640 then performs analysis on container usage information 637 such as that described earlier, and in so doing, generates container usage feature information 650. The container usage pattern analyzer identifies the potential patterns and learn/estimate/obtain the features of each identified pattern. An example of the information included in container usage feature information 650 is shown in Table 2. Container usage feature information such as container usage feature information 650 is obtained from the attributes in Table 2.

TABLE 2

An example of container usage features and attributes.

| Pattern | Feature |
|---|---|
| p11 | fn1, fn2 |
|  | (e.g., mean, covariance, sampled data) |
| p12 | ... |
| ... | ... |

After one or more backups (e.g., identified by backup identifier (BID)) have been selected as having sufficiently high affinity with respect to the current backup sample, container usage pattern analyzer 640 can generate feature information (depicted as catalog container usage feature information 655) in a comparable fashion. An example of the information included in catalog container usage feature information 655 is shown in Table 3. As will be appreciated in light of the present disclosure, each backup can have multiple clusters (referred to herein as patterns). Each such pattern is described as the backup's feature. The container ranges employed can be used to identify data containers in these backups that most closely match the sample of the new backup, for example.

TABLE 3

An example of catalog backups pattern information.

| BID | Pattern | Pattern | Pattern | Pattern |
|---|---|---|---|---|
| B1 | $p_{11}$ | $p_{12}$ | $p_{13}$ | ... |
| B2 | $p_{21}$ | $p_{22}$ | $p_{23}$ | ... |
| B3 | $p_{31}$ | $p_{32}$ | $p_{33}$ | ... |
| ... | ... | ... | ... | ... |

As will also be appreciated, container usage pattern analyzer 640, in order to perform container usage pattern mining operations, can also be trained using fingerprint and data container information stored in fingerprint catalog 634 existing backups or comparable data inputs.

A container range calculation unit 660 takes as input container usage feature information 650 and catalog container usage feature information 655, and, respectively, produces information regarding container ranges for each. In one embodiment, with regard to container usage feature information 650, container range calculation unit 660 employs a relatively large RCV, providing for the coverage of as much information in the sample window as possible. In such an embodiment, with regard to catalog container usage feature information 655, container range calculation unit 660 employs an RCV that can be tailored to the number of containers that are to be fetched. Thus, in the latter case, an RCV can be chosen such that the data containers fetched provide good coverage for the expected data containers of the new backup in question.

Container range calculation unit 660 outputs the calculated container ranges for the new backup and for the selected existing backups to a container range determination unit 661. In one embodiment, container range determination unit 661 produces information regarding the various container ranges, as well as each container range's affinity, as container range affinity information 665. Such information can be stored in a container range data structure (e.g., a listing of value tuples).

An example of information that can be included in container range affinity information 665 implemented as a container range affinity list is shown in Table 4.

TABLE 4

An example of a container range information data structure.

| Container Range | Affinity |
|---|---|
| $[l_1, h_1, \mu_1]$ | 100 |
| $[l_2, h_2, \mu_2]$ | 90 |
| $[l_3, h_3, \mu_3]$ | 30 |

Once generated, container range affinity information 665 can be provided to a container selection unit 670. Container selection unit 670 can, for example, select one or more data containers within the given container ranges, where such data containers will exhibit sufficient affinity with the data of the new backup. As will be further appreciated, the number of such data containers can be selected (e.g., as by tuning the RCV used by container range calculation unit 660) such that sufficiently-high deduplication performance (e.g., deduplication rate) is achieved, while minimizing the amount of data to be transferred. The output of container selection unit 670 is output as an output to prefetch unit 680.

Figure 7:
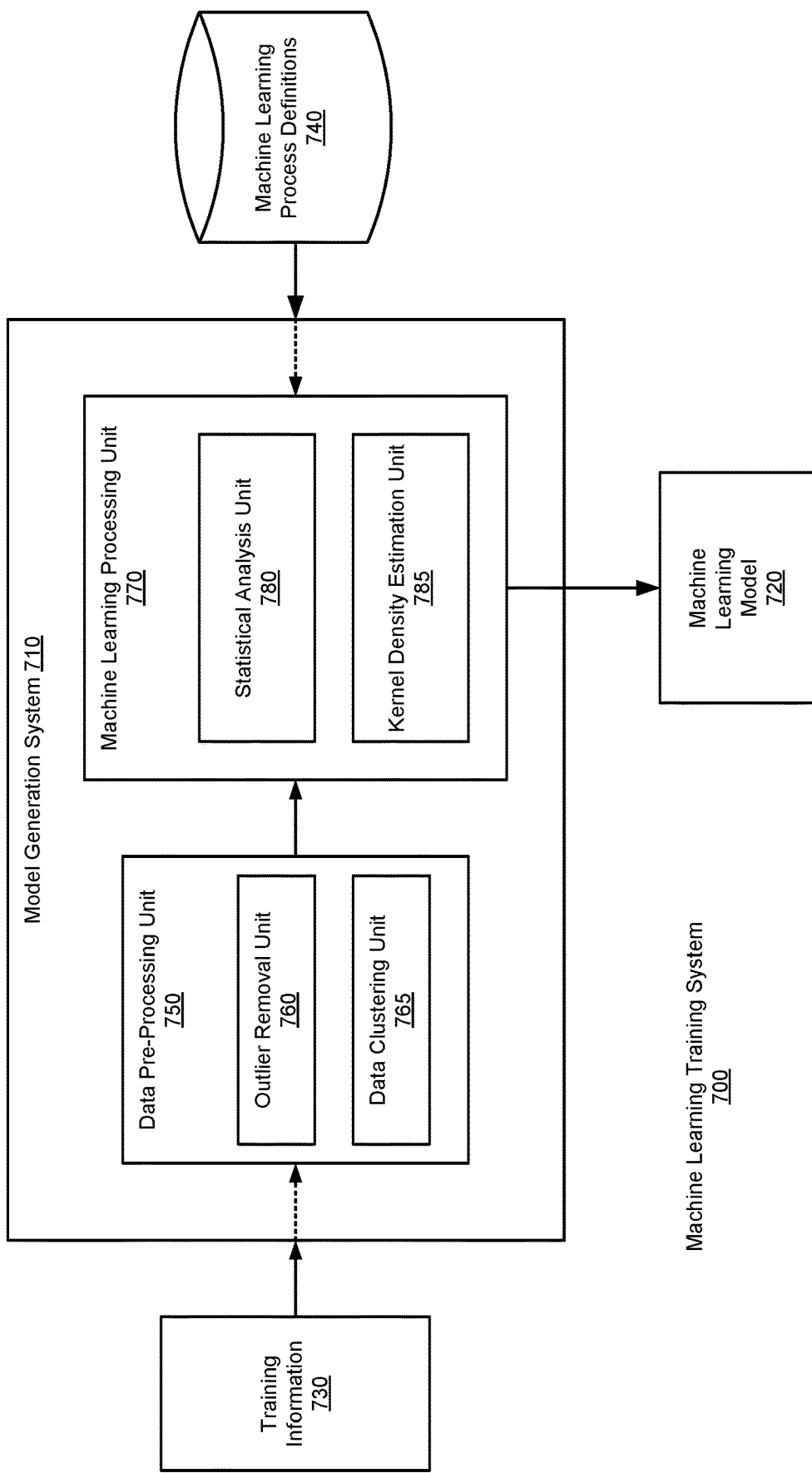
FIG. 7 is a simplified block diagram illustrating an example of a machine learning training system, according to methods and systems such as those described herein.

FIG. 7 is a simplified block diagram illustrating an example of a machine learning training system, according to methods and systems such as those described herein. FIG. 7 thus depicts a machine learning training system 700. Machine learning training system 700 includes a model generation system 710. Model generation system 710 generates a machine learning model 720 from training information 730, based on, for example, one or more machine learning process definitions (depicted as machine learning process definitions 740). In the manner noted, training information 730 can include the data of one or more backups (e.g., the deduplicated data segments of one or more data containers of such backups), the information regarding the fingerprints of which might be stored, for example, in a fingerprint catalog such as fingerprint catalog 630 of FIG. 6, described above.

Model generation system 710 takes in training information 730 as an input, and passes training information 730 through a data pre-processing unit 750. Data pre-processing unit 750 can include, in certain embodiments, an outlier removal unit 760 and a data clustering unit 765. In the manner noted, outlier removal unit 760 filters out outlying data points/clusters in order to allow the machine learning model generated (e.g., machine learning model 720) to more accurately determine the representative weight of a pattern or feature. As also noted, data clustering unit 765 clusters data points, such as fingerprints referenced by DCID, in the data containers received as training information 730, into clusters (groups) that can be analyzed with regard to features and patterns extant therein, and so facilitate a more accurate representation by machine learning model 720. Data clustering unit 765 supports the clustering of data points, in order to define one or more groups having sufficiently high locality, in terms of DCID. For example, a density-based clustering algorithm such as density-based spatial clustering of applications with noise (DBSCAN) can be employed.

Training information 730, having been processed by data preprocessing unit 750, is output by data preprocessing unit 750 as preprocessed data, and is received by a machine learning processing unit 770. Machine learning processing unit 770 performs feature extraction on the preprocessed data in accordance with one or more machine learning process definitions received by machine learning processing unit 770 from machine learning process definitions 740, in order to generate machine learning model 720. To this end, machine learning processing unit 770 includes, in certain embodiments, a statistical analysis unit 780 and a kernel density estimation unit 785. Statistical analysis unit 780 can perform a statistical analysis (e.g., a Chi-square analysis) of the preprocessed data, in order to identify a probability density distribution that fits the preprocessed data. Kernel density estimation unit 785 provides functionality that supports the learning of features (e.g., such as mean, covariance, and bandwidth) of the selected distribution, as received from statistical analysis unit 780.

The operations performed by machine learning processing unit 770 result in machine learning model 720. Machine learning model 720 can then be used in analyzing the data segments of the data containers of one or more backups, in order to identify one or more data containers to be prefetched.

Figure 8:
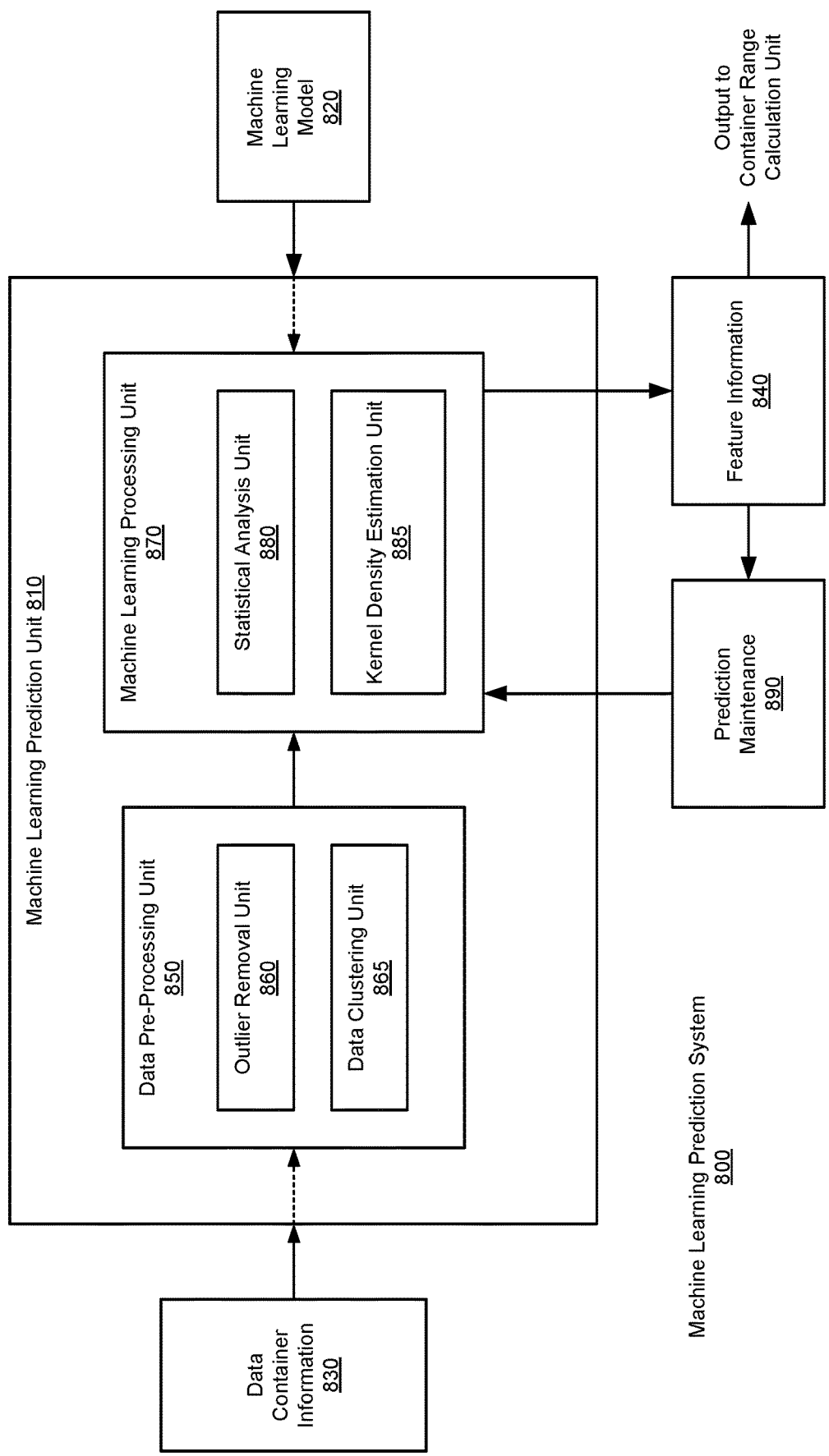
FIG. 8 is a simplified block diagram illustrating an example of a machine learning prediction system, according to methods and systems such as those described herein.

FIG. 8 is a simplified block diagram illustrating an example of a machine learning prediction system, according to methods and systems such as those described herein. FIG. 8 thus depicts a machine learning prediction system 800. Machine learning prediction system 800 includes a machine learning prediction unit 810. Machine learning prediction 810 receives a machine learning model 820 and data container information 830, and produces feature information 840. In the manner noted, data container information 830, in certain embodiments, represent a sample of the data segments of a new backup made using a new backup policy (e.g., as might be provided by a fingerprint generator such as fingerprint generator 620 of FIG. 6).

As with machine learning training system 700, machine learning prediction system 810 takes in data container information (in this case, data container information 830) as an input, and passes this data container information through a data pre-processing unit 850. Data pre-processing unit 850 can include, in certain embodiments, an outlier removal unit 860 and a data clustering unit 865. In the manner noted, outlier removal unit 860 filters out outlying data points/clusters in order to more accurately depict the representative weight of a pattern or feature. As also noted, data clustering unit 865 clusters data points, such as fingerprints referenced by DCID (e.g., in [DCID, logical size] pairs), in the data received as training information 830, into clusters (groups) that can be analyzed with regard to features and patterns thereof. Data clustering unit 865 supports the clustering of data points, in order to define one or more groups having sufficiently high locality, in terms of DCID. For example, a density-based clustering algorithm such as density-based spatial clustering of applications with noise (DBSCAN) can be employed.

Data container information 830, having been processed by data preprocessing unit 850, is output by data preprocessing unit 850 as preprocessed data, and is received by a machine learning processing unit 870. Machine learning processing unit 870 performs feature extraction on the preprocessed data in accordance with machine learning model 820. To this end, machine learning processing unit 870 includes, in certain embodiments, a statistical analysis unit 880 and a kernel density estimation unit 885. Statistical analysis unit 880 can perform a statistical analysis (e.g., a Chi-square analysis) of the preprocessed data, in order to identify a probability density distribution that fits the preprocessed data. Kernel density estimation unit 885 provides functionality that supports the learning of features (e.g., such as mean, covariance, and bandwidth) of the selected distribution, as received from statistical analysis unit 880.

The feature extraction performed by machine learning processing unit 870 results in feature information 840. Feature information 840 is passed to a container range calculation unit (e.g., a container range calculation unit such as container range calculation unit 660 of FIG. 6). Additionally, in certain embodiments, feature information 840 can be passed to a prediction maintenance unit 890. Prediction maintenance unit 890 can provide for feedback of feature information such as feature information 842 machine learning processing unit 870, in order to maintain parameters used by statistical analysis unit 880 and/or kernel density estimation unit 885.

Example Deduplication Process

As noted previously, data deduplication (or more simply, deduplication) is a process that eliminates redundant copies of data and reduces storage and transfer overhead. Deduplication ensures that only one unique instance of data is retained on a storage device. Redundant data blocks are replaced with a pointer to the unique data copy. Source-based deduplication (also called client-side deduplication) removes redundant blocks before transmitting data to a backup target such as a storage device, and can also provide facilities for determining if such data transfer is needed by checking fingerprints against fingerprints maintained by, for example, a backup server and/or a deduplication server. Performing deduplication at the source can reduce bandwidth and storage use.

As also noted, deduplication involves linking references to data content. Although each data segment may be referenced by more than one backup, storage reclamation can remove data segments in appropriate situations, such as if one or more backups associated with the data segments thus referenced have expired. For example, free space in the given data containers can be compacted to reclaim storage space recently made available, for example, as a result of the deletion of one or more backups resulting from the given backups having expired.

Figure 9A:
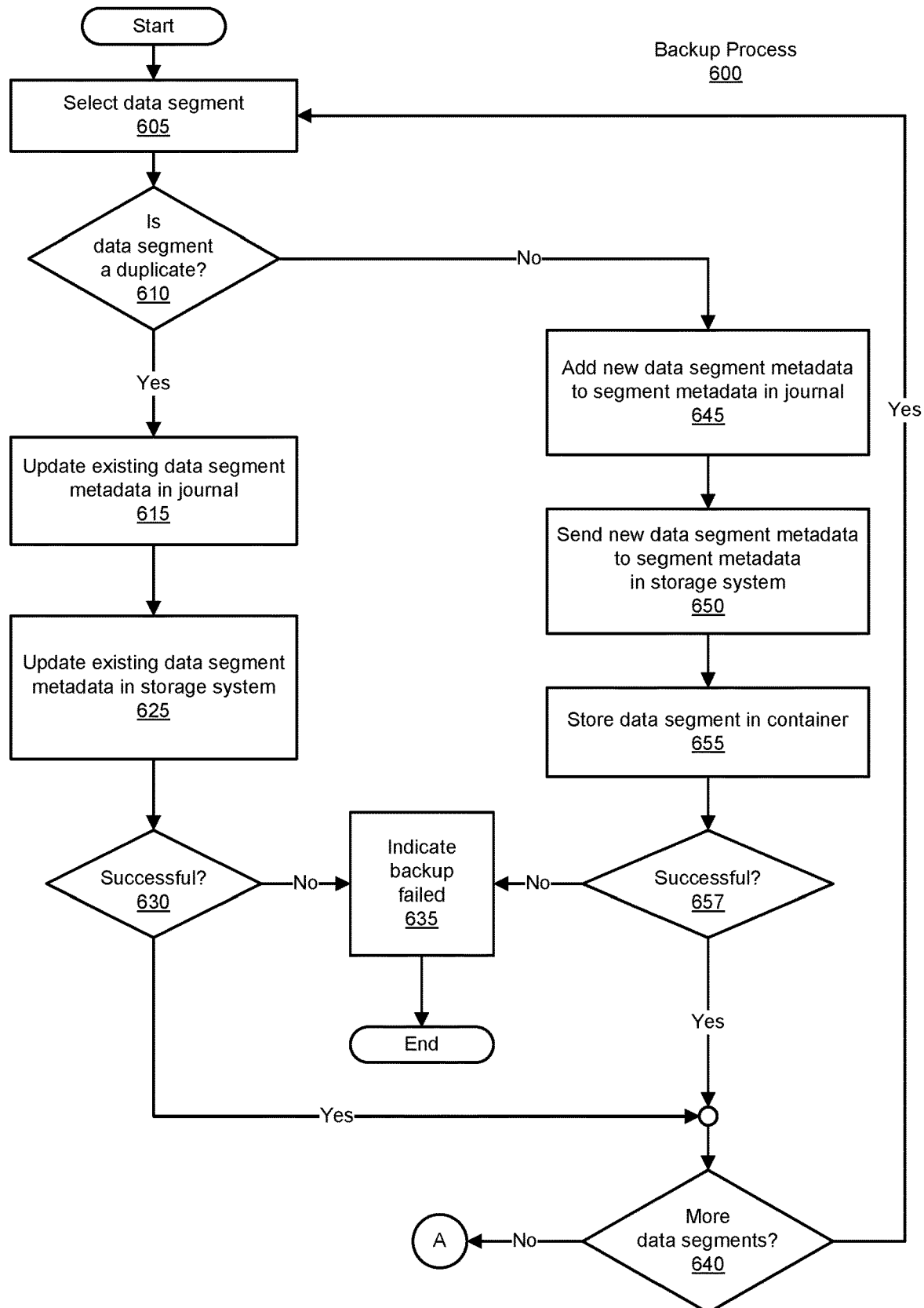
FIGS. 9A and 9B depict a flow diagram illustrating an example of a process for performing a deduplicated backup operation, according to embodiments of methods and systems such as those disclosed herein.
Figure 9B:
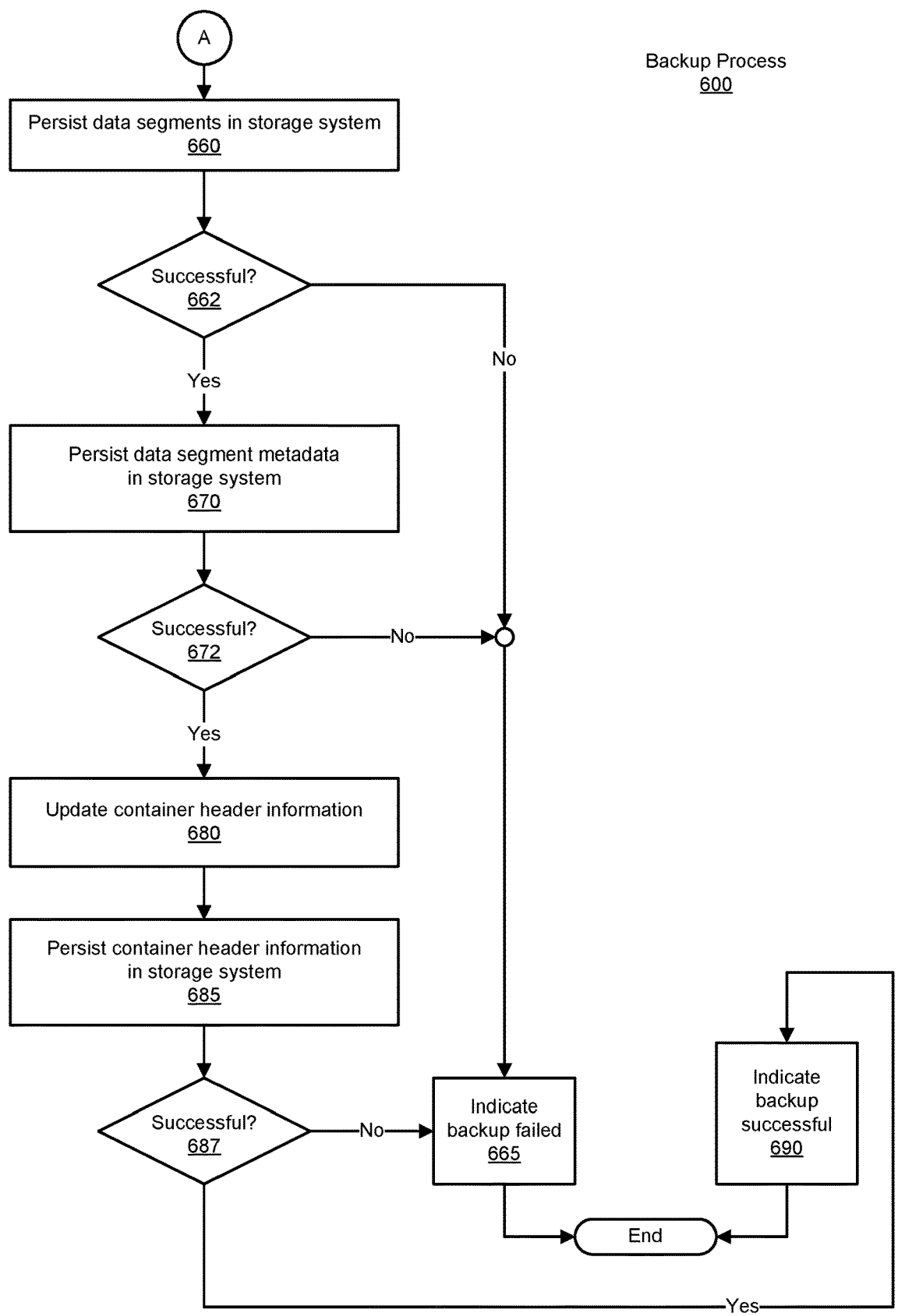

FIGS. 9A and 9B depict a flow diagram illustrating an example of a process for performing a deduplicated backup operation, according to embodiments of methods and systems such as those disclosed herein. That being the case, a deduplicated backup process 900 (or more simply backup process 900) is depicted. Backup process 900 begins with the receipt of an indication that a deduplicated backup is to be performed (not shown). If no such event has occurred, backup process 900 iterates, awaiting the occurrence of such an event. In response to a determination that a backup operation is to be performed, the data that is the subject of the backup operation is divided into a number of data segments. Each of these data segments can be represented by a fingerprint, as noted. To allow the present discussion to focus on the salient features of the embodiments described herein, backup process 900 depicts a simpler deduplication process then might otherwise be implemented. For example, caching of fingerprints at a client or server can be implemented, as can a number of techniques directed to improving backup operation performance.

With that in mind, backup process 900 begins with the selection of one of the data segments to be backed up (905). A determination is then made as to whether the data segment in question is a duplicate (910). If the data segment in question is a duplicate (and so, a duplicate data segment has already been stored), the corresponding data segment metadata stored in the journal is updated (915). Next, existing data segment metadata stored in the storage system is updated (925). A determination is made as to whether these operations were successful (930).

If the operations associated with updating the data segment's metadata were unsuccessful (e.g., some manner of failure was encountered), an indication to the effect that the attempted backup has failed is made (935). Backup process 900 then concludes. It will be appreciated that, as discussed subsequently, the indication of a failed backup may be used to prompt another attempt to backup the data in question.

If the operations associated with updating the data segment's metadata were successful, however, backup process 900 proceeds to a determination as to whether more data segments remain for deduplication (940). If further data segments remain for deduplication, backup process 900 loops to the selection of the next data segment (905) and backup process 900 continues. Alternatively, if the data in question has been deduplicated (940), backup process 900 proceeds to the remainder of that process by way of connector "A" to the process depicted in FIG. 9B.

Returning to the determination as to whether the data segment in question is a duplicate (910), if that determination indicates that the data segment in question is not a duplicate, backup process 900 proceeds with adding new data segment metadata (i.e., a new segment metadata block) to the copy of the container metadata stored in the journal (945). This new data segment metadata is also sent to the storage system for storage as a new segment metadata block in the container metadata (950).

As before, a determination is made as to whether the foregoing storage operations were successful (957). In the case in which these operations encountered a failure, an indication to that effect is made (935) and backup process 900 concludes. Alternatively, if the storage operations were successful, backup process 900 proceeds with making a determination as to whether further data segments remain to be deduplicated (940). As before, if further data segments remain, backup process 900 loops to the selection of the next data segment (905) and backup process 900 proceeds with the processing of that data segment. In the alternative, if no further data segments remain, backup process 900 proceeds to the remainder of that process by way of connector "A" to the process depicted in FIG. 9B.

FIG. 9B depicts the remainder of backup process 900. Beginning with connector "A", backup process 900 proceeds with persisting the (deduplicated) data segments in the storage system (960). As before, a determination is made as to whether this operation was successful (962). If the operation was unsuccessful, an indication that the backup operation has failed is provided (965). As before, in such a situation, backup process 900 then concludes.

If the backup's data segments were successfully persisted to the storage system, backup process 900 proceeds with the persisting of data segment metadata (segment metadata blocks) in the storage system parentheses 970). Once again, a determination is made as to whether the operation in question was perform successfully (972). Also as before, if the operation was not perform successfully, an indication to this effect is provided (965) and backup process 900 concludes.

In the alternative, if the data segment metadata in question was successfully persisted to the storage system, container header information is updated (980) and is persisted to the storage system (985). Again, a determination is made as to whether the operations related to the given container header information were successful (987). If these operations were unsuccessful, an indication to this effect is provided (965) and backup process 900 concludes. Alternatively, if the operations related to saving the container header information were successful, an indication that the backup operations of backup process 900 were successful is provided (990) and backup process 900 concludes.

Examples of Deduplication Cache Operation Using Machine Learning

Figure 10:
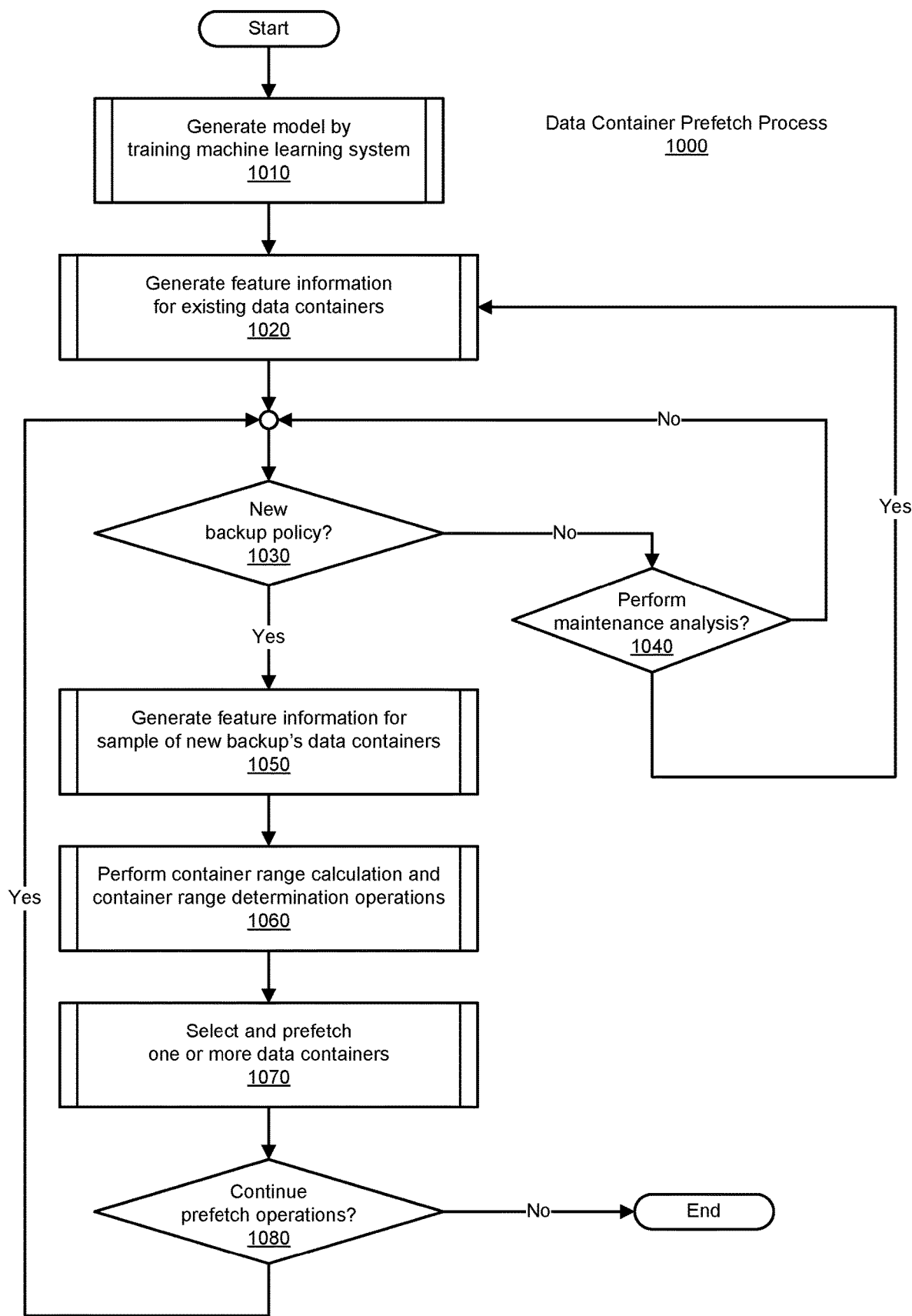
FIG. 10 is a flow diagram illustrating an example of a data container prefetch process, according to one embodiment.

FIG. 10 is a flow diagram illustrating an example of a data container prefetch process, according to one embodiment. FIG. 10 thus depicts a data container prefetch process 1000. Data container prefetch process 1000 begins with the generation of a model, which can be accomplished by training the machine learning system in question (1010). Such model generation can be performed by a model generation systems such as model generation system 710 of FIG. 7. An example of such a model generation process is described in further detail in connection with FIG. 11, subsequently.

Next, feature information is generated for one or more existing backups' data containers (1020). Such feature information can be generated by a container usage pattern analyzer such as container usage pattern analyzer 640, which can be implemented in the manner of machine learning prediction unit 810. An example of such a feature information generation process is described in further detail in connection with FIG. 11, subsequently.

At this juncture, data container prefetch process 1000 awaits the implementation of a new backup policy (1030). Until such time as a new backup policy is implemented, data container prefetch process 1000 iterates. As part of such iteration, data container prefetch process 1000 can make a determination as to whether maintenance analysis needs to be performed (1040). Such maintenance analysis can be performed on a periodic basis, such as on a daily, weekly, or monthly basis, depending on the frequency with which existing backups change. Alternatively, such a determination can be based on the amount of data represented by the existing backups, by sampling such existing backups to determine a percentage amount of change thereto, and/or by some other convenient metric. In the case in which no such maintenance analysis is to be performed, data container prefetch process 1000 loops to awaiting implementation of a new backup policy (1030). Alternatively, if maintenance analysis is to be performed, data container prefetch process 1000 loops to the generation of feature information for data containers of one or more existing backups (1020). An example of such a feature information generation process is described in further detail in connection with FIG. 12, subsequently.

Once a new backups received, feature information can be generated for the data segments of the new backup (or a sample portion thereof) (1050). An example of such a feature information generation process is described in further detail in connection with FIG. 13, subsequently. Next, container range calculations, and container range determination operations based thereon, using data segments of the new backup and data containers of one or more existing backups, are performed (1060). An example of such a container range calculation and determination process is described in further detail in connection with FIG. 14A, subsequently. Once the container ranges in question have been determined, one or more data containers are selected and can be prefetched (1070). An example of such a process is described in further detail in connection with FIG. 15, subsequently. A determination is then made as to whether prefetch operations are to continue (1080). In the case in which prefetch operations are to continue, data container prefetch process 1000 loops to awaiting the next new backup policy (1030). Alternatively, if prefetch operations are not to be continued, data container prefetch process 1000 concludes.

Figure 11:
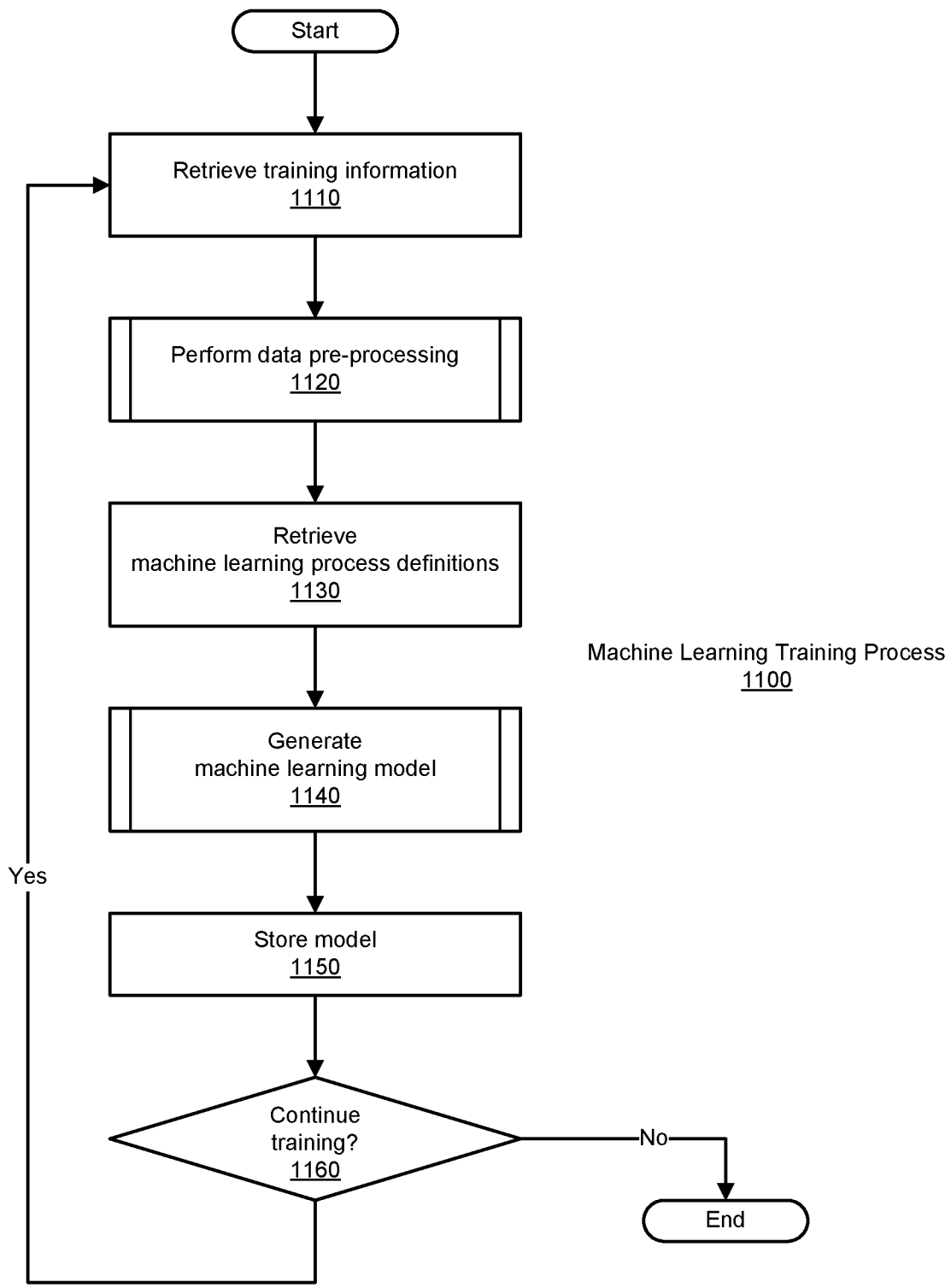
FIG. 11 is a flow diagram illustrating an example of a machine learning training process, according to one embodiment.

FIG. 11 is a flow diagram illustrating an example of a machine learning training process, according to one embodiment. As noted in connection with the description of FIG. 10, FIG. 11 thus depicts a machine learning training process 1100. Machine learning training process 1100 begins with the retrieval of training information (1110). Such training information can be the deduplicated data segments of one or more data containers of existing backups, for example, in the manner of training information 730 of FIG. 7.

Data preprocessing is then performed on the training information retrieved (1120). Such data preprocessing can be performed, for example, by a data preprocessing unit such as data preprocessing unit 750 of FIG. 7, and can include outlier removal and data clustering, in the manner previously noted. One or more machine learning process definitions are also retrieved (1130), as by a machine learning processing unit such as machine learning processing unit 770. Such a machine learning processing unit can then perform machine learning model generation (1140), which can include statistical analysis and/or kernel density estimation, in the manner noted. As was also noted, the machine learning model thus generated can then be used perform feature extraction, such as that described in connection with FIGS. 12 and 13, subsequently. The machine learning model thus generated can then be stored (1150). A determination is then made as to whether training operations should be continued (1160). In the case in which training operations are to continue, machine learning training process 1100 loops to the retrieval of additional training information (1110). Alternatively, if training operations are to cease, machine learning training process 1100 concludes.

Figure 12:
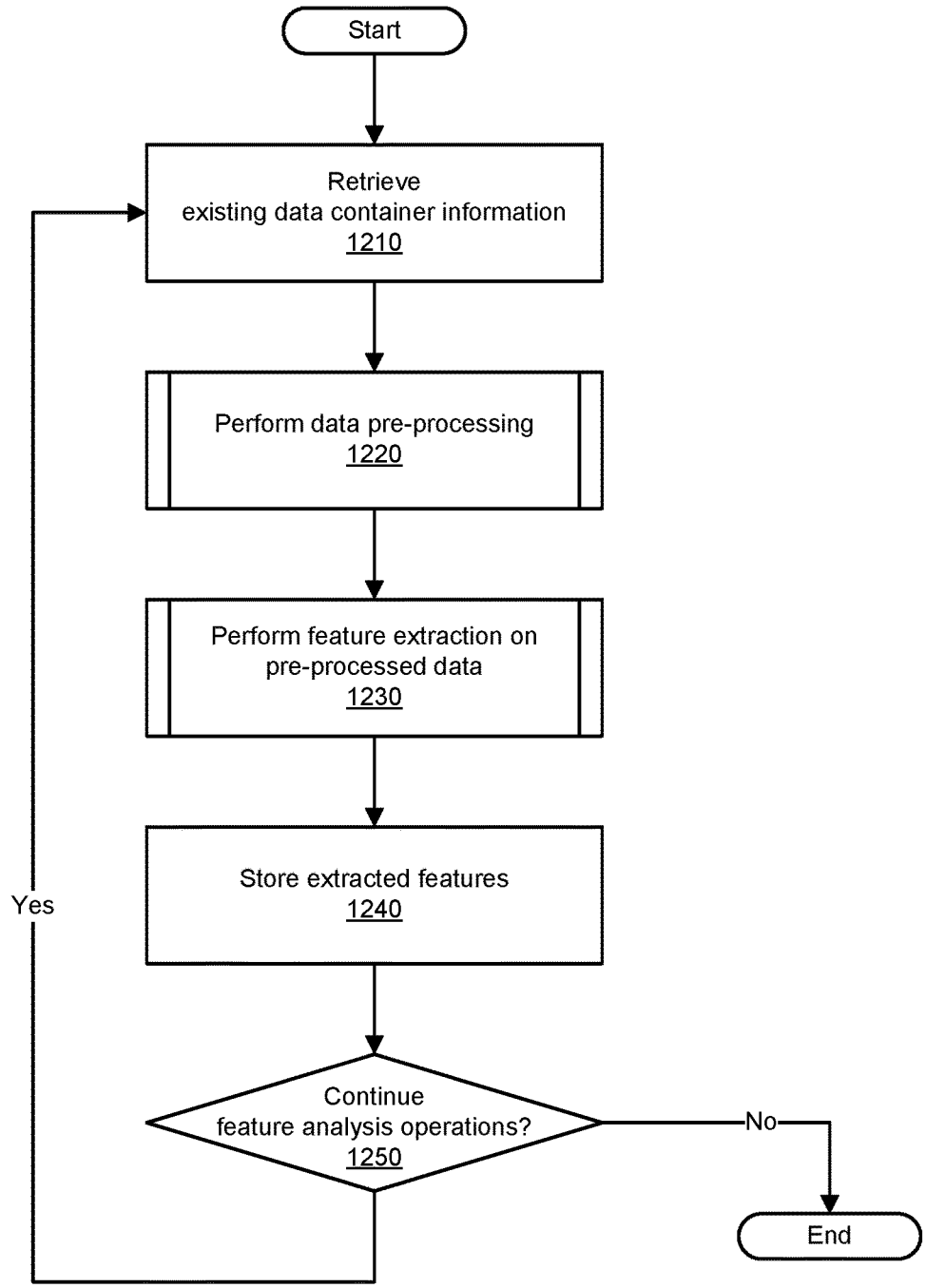
FIG. 12 is a flow diagram illustrating an example of a existing feature information generation process, according to one embodiment.

FIG. 12 is a flow diagram illustrating an example of an existing feature information generation process, according to one embodiment. As noted in connection with the description of FIG. 10, FIG. 12 thus depicts an existing feature information generation process 1200. Existing feature information generation process 1200 begins with the retrieval of data containers of one or more existing backups (1210). Such existing data container information can be, for example, deduplicated data segments of one or more data containers of existing backups. Next, data pre-processing is performed (1220). In the manner noted, such data pre-processing can include the application of a data clustering algorithm (e.g., DBSCAN) to cluster or group the data based on the locality, and outlier removal in order to filter out outlying data points. Such data pre-processing can be performed by a data pre-processing unit such as data pre-processing unit 850 of FIG. 8. The pre-processed data is then passed from the data pre-processing unit to a machine learning processing unit (e.g. machine learning processing unit 870 of FIG. 8), which performs feature extraction on the pre-processed data (1230). Such feature extraction can include statistical analysis and/or kernel density estimation, in the manner noted. The features and/or patterns thus extracted are then stored (1240). A determination is then made as to whether the feature analysis operations of existing feature information generation process 1200 are to be continued (1250). In the case in which such feature analysis operations are to continue, existing feature information generation process 1200 loops to the retrieval of further backup information (1210). Alternatively, if the desired existing backups have been analyzed, existing feature information generation process 1200 concludes.

Figure 13:
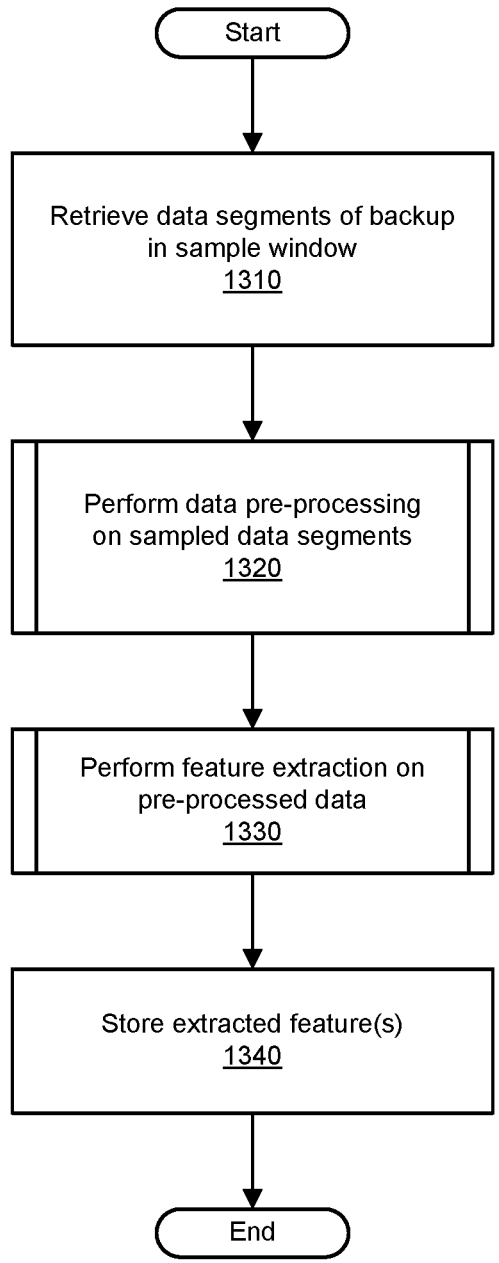
FIG. 13 is a flow diagram illustrating an example of a sample feature information generation process, according to one embodiment.

FIG. 13 is a flow diagram illustrating an example of a sample feature information generation process, according to one embodiment. As noted in connection with the description of FIG. 10, FIG. 13 thus depicts a sample feature information generation process 1300. Sample feature information generation process 1300 begins with the retrieval of data segments of the new backup that is within the sample window in question (1310). Such new data segments can be, for example, data segments of a backup subject to a new backup policy. Next, data pre-processing is performed (1320). In the manner noted, such data pre-processing can include the application of a data clustering algorithm (e.g., DBSCAN) to cluster or group the data based on the locality, and outlier removal in order to filter out outlying data points. Such data pre-processing can be performed by a data pre-processing unit such as data pre-processing unit 850 of FIG. 8. The pre-processed data is then passed from the data pre-processing unit to a machine learning processing unit (e.g. machine learning processing unit 870 of FIG. 8), which performs feature extraction on the pre-processed data (1330). Such feature extraction can include statistical analysis and/or kernel density estimation, in the manner noted. The features and/or patterns thus extracted are then stored (1340). Sample feature information generation process 1300 then concludes.

Figure 14A:
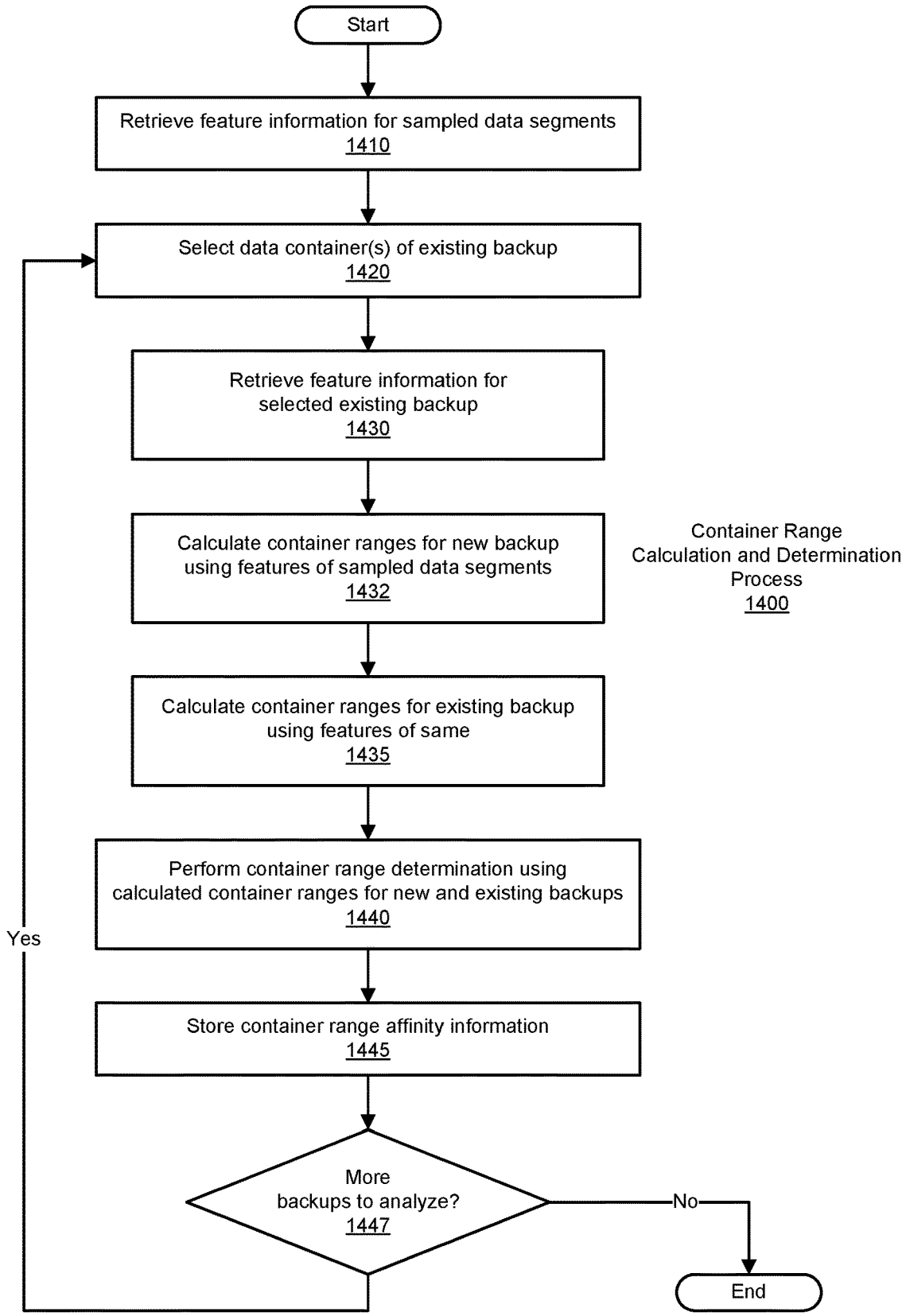
FIG. 14A is a flow diagram illustrating an example of a container range calculation and determination process, according to one embodiment.

FIG. 14A is a flow diagram illustrating an example of a container range calculation and determination process, according to one embodiment. As noted in connection with the description of FIG. 10, FIG. 14A thus depicts a container range calculation and determination process 1400. Container range calculation and determination process 1400 begins with the retrieval of feature information for a given sample (sampled data segments) of a new backup (1410). Next, data containers of an existing backup are selected (e.g., using the existing data containers' DCIDs) (1420). Next, feature information for the data containers of the selected existing backup are retrieved (1430). Container ranges for the new backup's data containers are then calculated using features of the sample data segments (1432). Container ranges for the data containers of the existing backup or calculated using features of the existing backup's data containers (1435). Container range determination operations are then performed using the calculated container ranges for the new and existing backups (1440). The resulting container range affinity information is then stored (1445).

A determination is then made as to whether the new backup should be analyzed with regard to further existing backups (1447). In the case in which more backups remain to be analyzed, container range calculation and determination process 1400 loops to selecting the data containers of the next existing backup for processing (1420). Alternatively, if no further backups remain to be analyzed, container range calculation and determination process 1400 concludes. The determination as to the number of data containers to be prefetched (into the cache in question) can be made, for example, based on a balance between the efficiency provided by a greater number of data containers and the resources needed to transfer the given amount of data segments. As noted earlier, the number of backups' data containers prefetched can be controlled by way of the RSV used in calculating the container ranges for the existing backups.

Figure 14B:
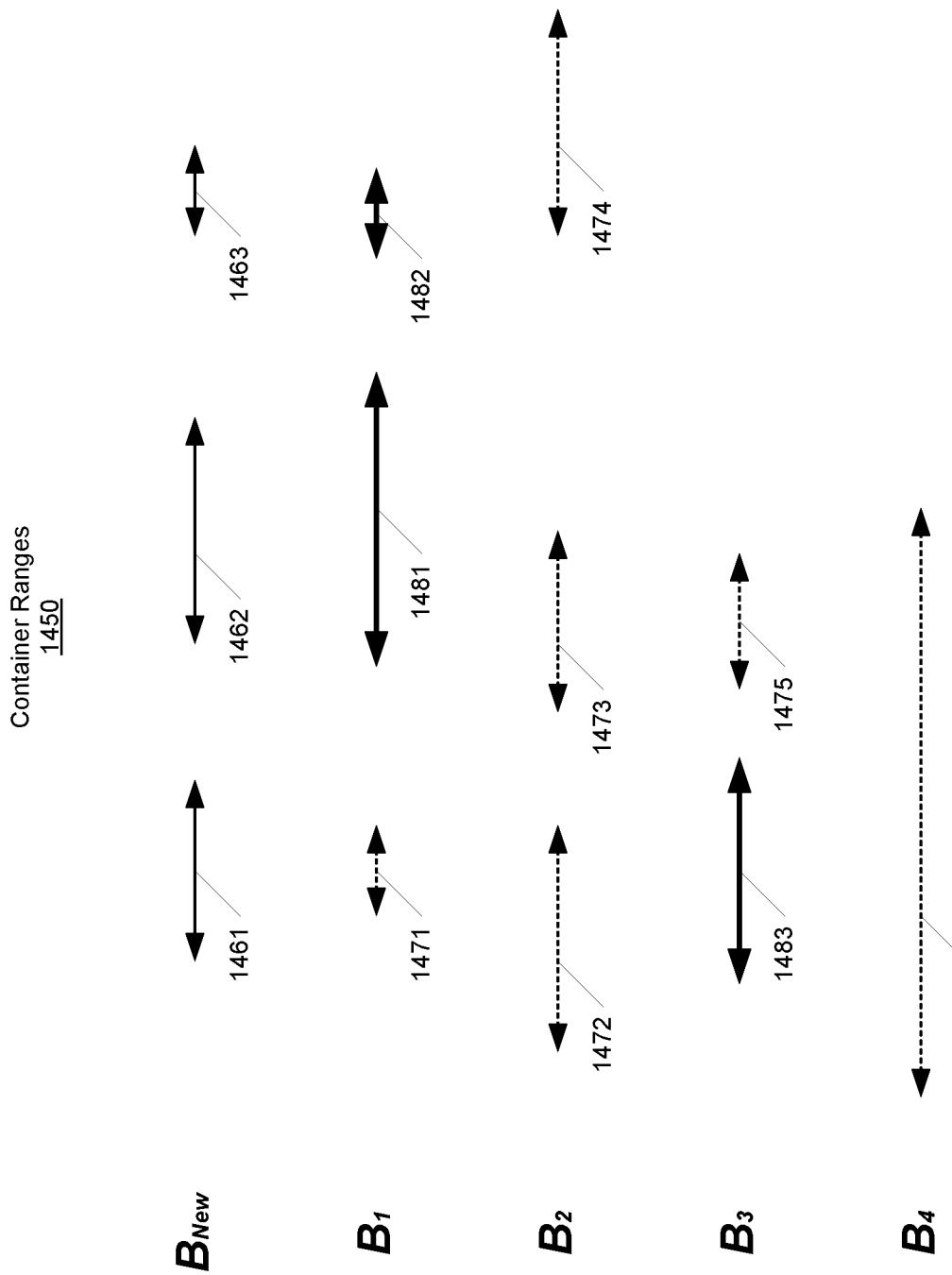
FIG. 14B is a simplified diagram illustrating an example of container ranges of a backup sample under a new backup policy and existing backups, according to methods and systems such as those described herein.

FIG. 14B is a simplified diagram illustrating an example of container ranges of a backup sample under a new backup policy and existing backups, according to methods and systems such as those described herein. FIG. 14B depicts a set of container ranges 1450 for existing backups $B_1$, $B_2$, $B_3$, and $B_4$, as well as a new backup $B_{New}$. Container ranges 1450 include those of new backup $B_{New}$ (depicted in FIG. 14B as container ranges 1461, 1462, and 1463). Container ranges 1450 also include container ranges for existing backups $B_1$, $B_2$, $B_3$, and $B_4$, which are illustrated as container ranges 1471, 1472, 1473, 1474, 1475, and 1476, shown in dotted lines, and container ranges 1481, 1482, and 1483, shown in bolded lines. As will be appreciated by reference to container ranges 1450, CUPM techniques employing a container range calculator are applied to historical backups (existing backups $B_1$, $B_2$, $B_3$, and $B_4$), and a portion of a backup scheduled to employ a new policy (new backup $B_{New}$), in order to obtain their container ranges. As can be seen, each backup may have multiple container ranges. A container range determiner such as that described herein is used to map the new backup's container ranges to their most affine container ranges of historical (existing) backups. The historical range that includes (or, in certain embodiments, completely contains) the container range of the new backup is considered as having priority over those with less coverage. If more than one such alternative exists, or there is no range that can satisfy the aforementioned priority condition, the affinity can be measured by the distance function: As is shown in FIG. 14B, such a process results in container ranges 1481, 1482, and 1483, which can be seen to most closely approximate and cover container ranges 1461, 1462, and 1463 in the sample of $B_{New}$ having been analyzed by the CUPA. By prefetching the fingerprints of the deduplicated data stored in the data containers thus identified, it will be appreciated that a great deal of information (representing the fingerprints in the other container ranges, as well as that not in those container ranges) can be avoided, and so, efficiency greatly improved. Further, having performed such analysis, the likelihood of having prefetched fingerprints used in the new backup also improves the deduplication rate of such operations.

Figure 15:
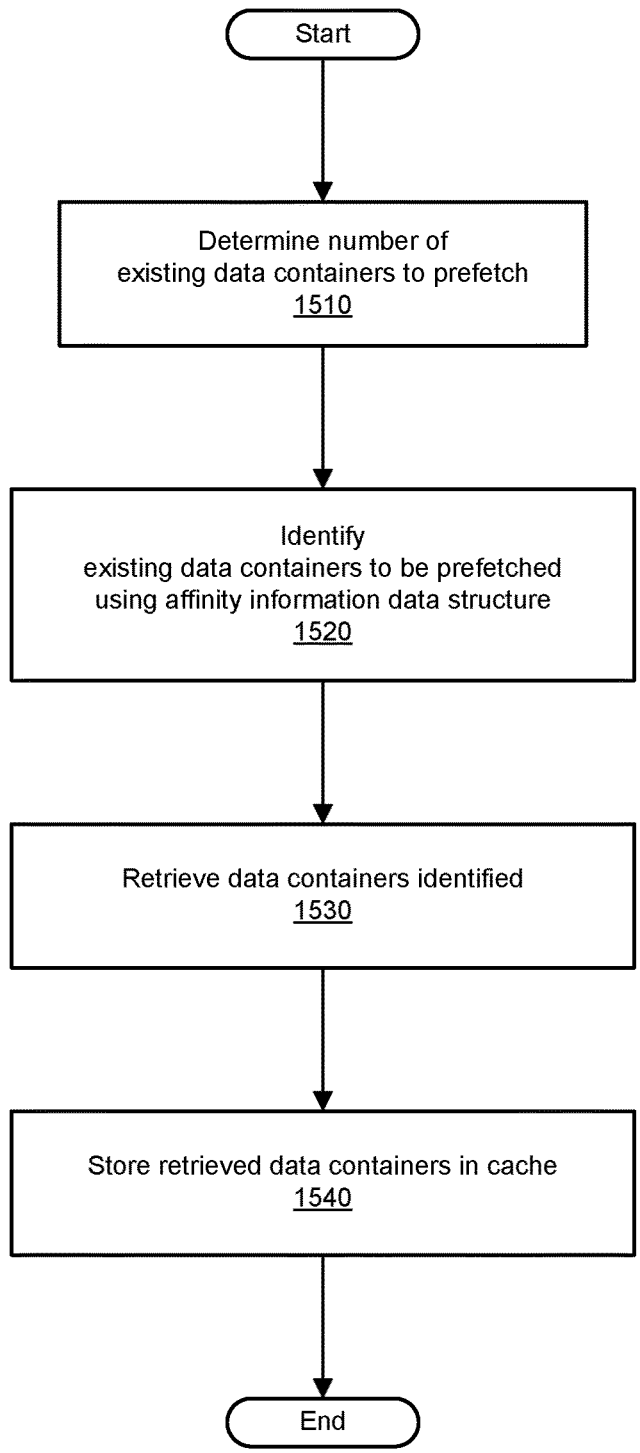
FIG. 15 is a flow diagram illustrating an example of a data container prefetch process, according to one embodiment.

FIG. 15 is a flow diagram illustrating an example of a data container prefetch process, according to one embodiment. As noted in connection with the description of FIG. 10, FIG. 15 thus depicts a data container prefetch process 1500. Data container prefetch process 1500 begins with a determination as to the number of existing data containers to prefetch (1510). As just noted, the number of data containers prefetched can be determined, for example, in an empirical manner, and tuned using the aforementioned RSVs. The existing data containers to be prefetched are then identified using the affinity information data structure (e.g., in the manner described previously) (1520). The data containers thus identified are then retrieved (1530). The retrieved data containers are then stored in the cache in question (1540). As will be appreciated, the retrieval and caching of these data containers is intended to be performed prior to deduplication operations being performed on the (new) backup using the new backup policy. However, such operations can be performed subsequent to the initiation of such deduplication operations, in certain embodiments. Data container prefetch process 1500 then concludes.

An Example Computing and Network Environment

As noted, the systems described herein can be implemented using a variety of computer systems and networks. The following illustrates an example configuration of a computing device such as those described herein. The computing device may include one or more processors, a random access memory (RAM), communication interfaces, a display device, other input/output (I/O) devices (e.g., keyboard, trackball, and the like), and one or more mass storage devices (e.g., optical drive (e.g., CD, DVD, or Blu-ray), disk drive, solid state disk drive, non-volatile memory express (NVME) drive, or the like), configured to communicate with each other, such as via one or more system buses or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, or the like.

Such CPUs are hardware devices that may include a single processing unit or a number of processing units, all of which may include single or multiple computing units or multiple cores. Such a CPU may include a graphics processing unit (GPU) that is integrated into the CPU or the GPU may be a separate processor device. The CPU may be implemented as one or more microprocessors, microcomputers, microcontrollers, digital signal processors, central processing units, graphics processing units, state machines, logic circuitries, and/or any devices that manipulate signals based on operational instructions. Among other capabilities, the CPU may be configured to fetch and execute computer-readable instructions stored in a memory, mass storage device, or other computer-readable storage media.

Memory and mass storage devices are examples of computer storage media (e.g., memory storage devices) for storing instructions that can be executed by the processors 502 to perform the various functions described herein. For example, memory can include both volatile memory and non-volatile memory (e.g., RAM, ROM, or the like) devices. Further, mass storage devices may include hard disk drives, solid-state drives, removable media, including external and removable drives, memory cards, flash memory, floppy disks, optical disks (e.g., CD, DVD, Blu-ray), a storage array, a network attached storage, a storage area network, or the like. Both memory and mass storage devices may be collectively referred to as memory or computer storage media herein and may be any type of non-transitory media capable of storing computer-readable, processor-executable program instructions as computer program code that can be executed by the processors as a particular machine configured for carrying out the operations and functions described in the implementations herein.

The computing device may include one or more communication interfaces for exchanging data via a network. The communication interfaces can facilitate communications within a wide variety of networks and protocol types, including wired networks (e.g., Ethernet, DOCSIS, DSL, Fiber, USB, etc.) and wireless networks (e.g., WLAN, GSM, CDMA, 802.11, Bluetooth, Wireless USB, ZigBee, cellular, satellite, etc.), the Internet and the like. Communication interfaces can also provide communication with external storage, such as a storage array, network attached storage, storage area network, cloud storage, or the like.

The display device may be used for displaying content (e.g., information and images) to users. Other I/O devices may be devices that receive various inputs from a user and provide various outputs to the user, and may include a keyboard, a touchpad, a mouse, a printer, audio input/output devices, and so forth. The computer storage media, such as memory 504 and mass storage devices, may be used to store software and data, such as, for example, an operating system, one or more drivers (e.g., including a video driver for a display such as display 160), one or more applications, and data. Examples of such computing and network environments are described below with reference to FIGS. 16 and 17.

Figure 16:
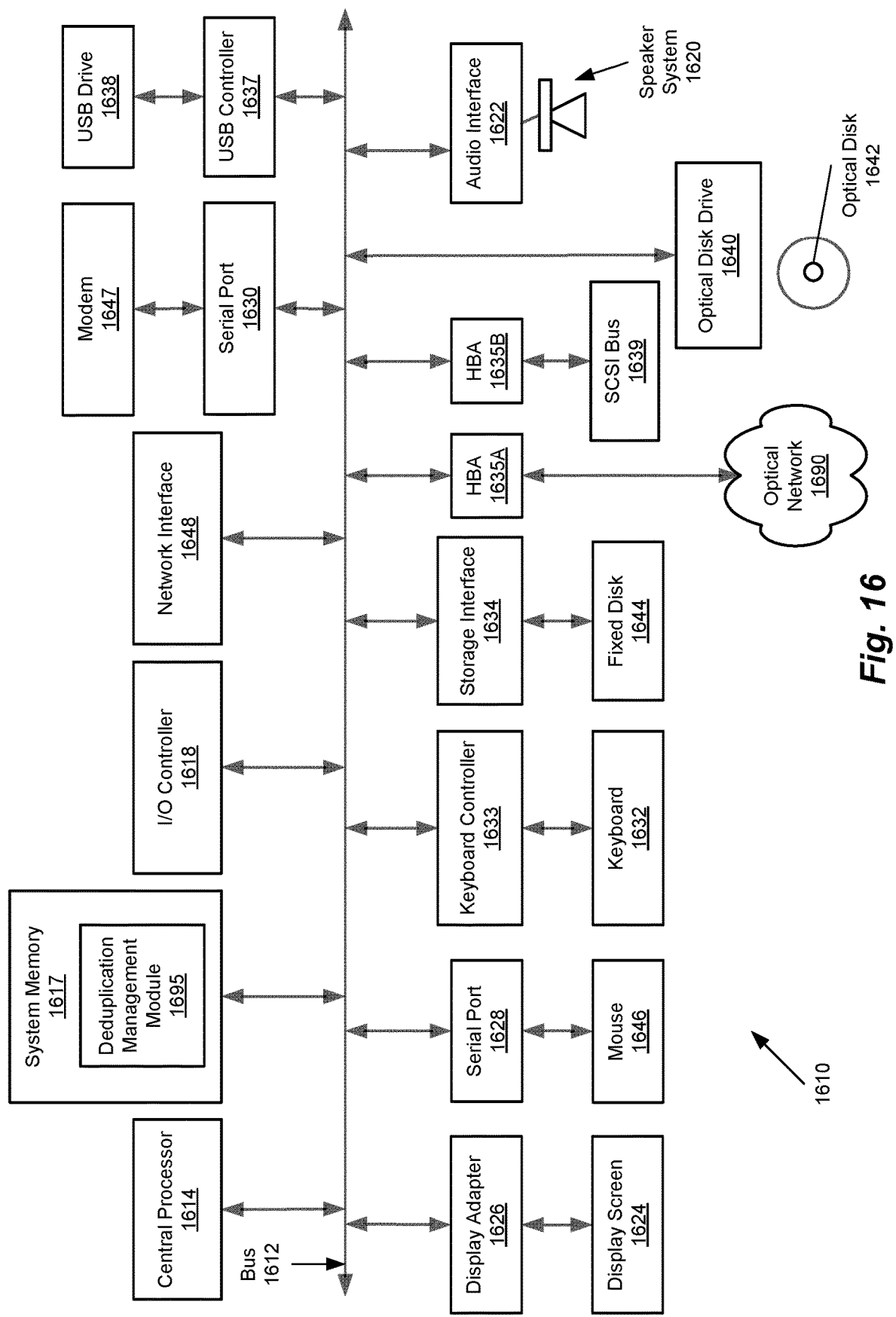
FIG. 16 is a simplified block diagram illustrating components of an example computer system suitable for implementing embodiments of the present disclosure, according to one embodiment.

FIG. 16 depicts a block diagram of a computer system 1610 suitable for implementing aspects of the systems described herein. Computer system 1610 includes a bus 1612 which interconnects major subsystems of computer system 1610, such as a central processor 1614, a system memory 1617 (typically RAM, but which may also include ROM, flash RAM, or the like), an input/output controller 1618, an external audio device, such as a speaker system 1620 via an audio output interface 1622, an external device, such as a display screen 1624 via display adapter 1626, serial ports 1628 and 1630, a keyboard 1632 (interfaced with a keyboard controller 1633), a storage interface 1634, a USB controller 1637 operative to receive a USB drive 1638, a host bus adapter (HBA) interface card 1635A operative to connect with a optical network 1690, a host bus adapter (HBA) interface card 1635B operative to connect to a SCSI bus 1639, and an optical disk drive 1640 operative to receive an optical disk 1642. Also included are a mouse 1646 (or other point-and-click device, coupled to bus 1612 via serial port 1628), a modem 1647 (coupled to bus 1612 via serial port 1630), and a network interface 1648 (coupled directly to bus 1612).

Bus 1612 allows data communication between central processor 1614 and system memory 1617, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1610 are generally stored on and accessed from a computer-readable storage medium, such as a hard disk drive (e.g., fixed disk 1644), an optical drive (e.g., optical drive 1640), a universal serial bus (USB) controller 1637, or other computer-readable storage medium.

Storage interface 1634, as with the other storage interfaces of computer system 1610, can connect to a standard computer-readable medium for storage and/or retrieval of information, such as a fixed disk drive 1644. Fixed disk drive 1644 may be a part of computer system 1610 or may be separate and accessed through other interface systems. Modem 1647 may provide a direct connection to a remote server via a telephone link or to the Internet via an internet service provider (ISP). Network interface 1648 may provide a direct connection to a remote server via a direct network link to the Internet via a POP (point of presence). Network interface 1648 may provide such connection using wireless techniques, including digital cellular telephone connection, Cellular Digital Packet Data (CDPD) connection, digital satellite data connection or the like. Also depicted as part of computer system 1610 is a deduplication management module 1695, which is resident in system memory 1617 and provides functionality and operations comparable to the deduplication processes described earlier herein.

Many other devices or subsystems (not shown) may be connected in a similar manner (e.g., document scanners, digital cameras and so on). Conversely, all of the devices shown in FIG. 16 need not be present to practice the systems described herein. The devices and subsystems can be interconnected in different ways from that shown in FIG. 16. The operation of a computer system such as that shown in FIG. 16 will be readily understood in light of the present disclosure. Code to implement portions of the systems described herein can be stored in computer-readable storage media such as one or more of system memory 1617, fixed disk 1644, optical disk 1642, or USB drive 1638. The operating system provided on computer system 1610 may be WINDOWS, UNIX, LINUX, IOS, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 17:
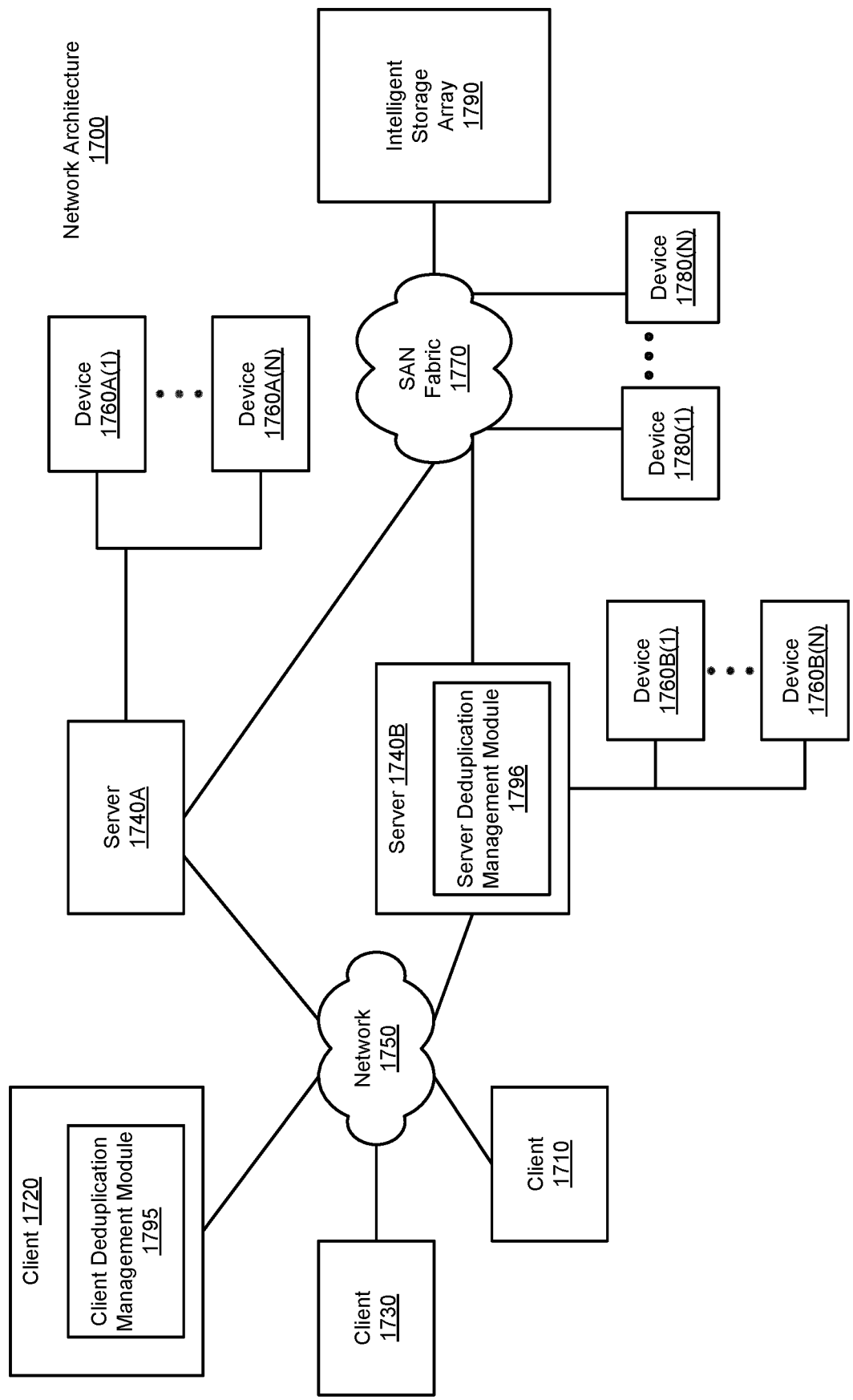
FIG. 17 is a simplified block diagram illustrating components of an example computer system suitable for implementing embodiments of the present disclosure, according to one embodiment.

FIG. 17 is a block diagram depicting a network architecture 1700 in which client systems 1710, 1720 and 1730, as well as storage servers 1740A and 1740B (any of which can be implemented using computer system 1710), are coupled to a network 1750. Storage server 1740A is further depicted as having storage devices 1760A(1)-(N) directly attached, and storage server 1740B is depicted with storage devices 1760B(1)-(N) directly attached. Storage servers 1740A and 1740B are also connected to a SAN fabric 1770, although connection to a storage area network is not required for operation. SAN fabric 1770 supports access to storage devices 1780(1)-(N) by storage servers 1740A and 1740B, and so by client systems 1710, 1720 and 1730 via network 1750. An intelligent storage array 1790 is also shown as an example of a specific storage device accessible via SAN fabric 1770.

Also depicted as part of network architecture 1700 are a client deduplication management module 1795 (installed in client 1720), and a server deduplication management module 1796 (installed in server 1740B), which are comparable in function and operation to various of the deduplication management modules described earlier herein. For example, using the components depicted in FIG. 6, client deduplication management module 1795 can provide functionality associated with the generation of backup 605 (as well as the segmentation of backup 605 into data segments 610), sample window 615, and fingerprint generation (e.g., as by figure print generator 620). Further, server deduplication management module 1796 can support storage and maintenance of fingerprint catalog 630, as well as the functionalities provided by container usage retrieval unit 635, container usage pattern analyzer 640, distance determination unit 660, backup selection unit 670, and provide for the prefetching of such backups.

With reference to computer system 1610, modem 1647, network interface 1648 or some other method can be used to provide connectivity from each of client computer systems 1710, 1720 and 1730 to network 1750. Client systems 1710, 1720 and 1730 are able to access information on storage server 1740A or 1740B using, for example, a web browser or other client software (not shown). Such a client allows client systems 1710, 1720 and 1730 to access data hosted by storage server 1740A or 1740B or one of storage devices 1760A(1)-(N), 1760B(1)-(N), 1780(1)-(N) or intelligent storage array 1790. FIG. 17 depicts the use of a network such as the Internet for exchanging data, but the systems described herein are not limited to the Internet or any particular network-based environment.

OTHER EMBODIMENTS

The example systems and computing devices described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

Such example systems and computing devices are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

The foregoing thus describes embodiments including components contained within other components. Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation. As such, the various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

In light of the foregoing, it will be appreciated that the foregoing descriptions are intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   determining first container range information for a first one or more containers of a first plurality of containers of a new backup image, wherein
      the determining the first container range information comprises
         generating new feature information from the first one or more containers, and
         generating the first container range information from the new feature information, and
      the generating the first container range information comprises performing a container range calculation;
   determining a container range affinity between the first container range information and second container range information, wherein
      the second container range information is for a second one or more containers of a second plurality of containers of one or more existing backup images;
   identifying at least one container of the second one or more containers based, at least in part, on a result of the determining the container range affinity;
   prefetching the at least one container; and
   performing a deduplication operation on a unit of data of the new backup image, wherein
      the deduplication operation comprises
         comparing
            a fingerprint of the unit of data
            and
            one or more fingerprints of one or more units of data of the at least one container.

2. The method of claim 1, wherein
   the new feature information was generated as an output of a machine learning process that received the first one or more containers as an input, and
   the generating the second container range information comprises
   performing the container range calculation using existing feature information for the one or more existing backup images, wherein
      the existing feature information was generated as an output of a machine learning process that received the second one or more containers as another input.

3. The method of claim 1, wherein
   the new feature information is generated as a first output of a machine learning process, and
   the machine learning process receives the first one or more containers as an input.

4. The method of claim 3, further comprising:
   generating existing feature information for the second one or more containers, wherein the existing feature information is generated as a second output of the machine learning process,
the machine learning process receives the second one or more containers as another input and
the generating the second container range information comprises performing the container range calculation using the existing feature information.

5. The method of claim 1, further comprising:
storing the second container range information, wherein
the storing facilitates determining another container range affinity between third container range information and the second container range information, and
the third container range information is for one or more portions of another new backup image.

6. The method of claim 1, further comprising:
maintaining affinity information, wherein
the affinity information facilitates the determining by virtue of being configured to represent a frequency of containers of a plurality of existing backup images selected based on one or more container ranges of a plurality of new backup images.

7. The method of claim 1, wherein
the determining is performed by a container range determiner,
an output of the container range determiner is container range affinity information, and
the container range affinity information is stored in a container range information data structure.

8. The method of claim 7, wherein
the container range affinity information comprises
a container range, and
an affinity score, and
the container range comprises
lower bound,
mean, and
upper bound.

9. The method of claim 1, wherein
the first container range information is determined using a first range control value,
the second container range information is determined using a second range control value, and
the first range control value is larger than the second range control value.

10. A non-transitory computer-readable storage medium, comprising program instructions, which, when executed by one or more processors of a computing system, perform a method comprising:
determining first container range information for a first one or more containers of a first plurality of containers of a new backup image, wherein
the determining the first container range information comprises
generating new feature information from the first one or more containers, and
generating the first container range information from the new feature information, and
the generating the first container range information comprises performing a container range calculation;
determining a container range affinity between the first container range information and second container range information, wherein
the second container range information is for a second one or more containers of a second plurality of containers of one or more existing backup images;

identifying at least one container of the second one or more containers based, at least in part, on a result of the determining the container range affinity;
prefetching the at least one container; and
performing a deduplication operation on a unit of data of the new backup image, wherein
the deduplication operation comprises
comparing
a fingerprint of the unit of data
and
one or more fingerprints of one or more units of data of the at least one container.

11. The non-transitory computer-readable storage medium of claim 10, wherein
the new feature information is generated as a first output of a machine learning process, and
the machine learning process receives the first one or more containers.

12. The non-transitory computer-readable storage medium of claim 11, the method further comprising:
generating existing feature information for the second one or more containers portions of the existing backup image, wherein
the existing feature information is generated as a second output of the machine learning process,
the machine learning process receives the second one or more containers portions of the existing backup image as another input and
the generating the second container range information comprises performing the container range calculation using the existing feature information.

13. The non-transitory computer-readable storage medium of claim 10, the method further comprising:
storing the second container range information, wherein
the storing facilitates determining another container range affinity between third container range information and the second container range information, and
the third container range information is for one or more portions of another new backup image.

14. The non-transitory computer-readable storage medium of claim 10, the method further comprising:
maintaining affinity information, wherein
the affinity information facilitates the determining by virtue of being configured to represent a frequency of containers of a plurality of existing backup images selected based on one or more container ranges of a plurality of new backup images.

15. The non-transitory computer-readable storage medium of claim 10, wherein
the determining is performed by a container range determiner,
an output of the container range determiner is container range affinity information, and
the container range affinity information is stored in a container range information data structure.

16. The non-transitory computer-readable storage medium of claim 15, wherein
the container range affinity information comprises
a container range, and
an affinity score, and
the container range comprises
lower bound,
mean, and
upper bound.

17. The non-transitory computer-readable storage medium of claim 10, wherein the first container range information is determined using a first range control value, the second container range information is determined using a second range control value, and the first range control value is larger than the second range control value.

18. A computing system comprising:

one or more processors; and a computer-readable storage medium coupled to the one or more processors, comprising program instructions, which, when executed by the one or more processors, perform a method comprising determining first container range information for a first one or more containers of a first plurality of containers of a new backup image, wherein the determining the first container range information comprises generating new feature information from the first one or more containers, and generating the first container range information from the new feature information, and the generating the first container range information comprises performing a container range calculation, determining a container range affinity between the first container range information and second container range information, wherein the second container range information is for a second one or more containers of a second plurality of containers of one or more existing backup images, identifying at least one portion of the one or more portions of the one or more existing backup images based, at least in part, on a result of the determining, identifying at least one container of the second one or more containers based, at least in part, on a result of the determining the container range affinity, prefetching the at least one container, and performing a deduplication operation on a unit of data of the new backup image, wherein the deduplication operation comprises comparing a fingerprint of the unit of data and one or more fingerprints of one or more units of data of the at least one container.

19. The computing system of claim 18, wherein the new feature information is generated as a first output of a machine learning process, the machine learning process receives the first one or more containers as an input, the method further comprises generating existing feature information for the second one or more containers, wherein the existing feature information is generated as a second output of the machine learning process, the machine learning process receives the second one or more containers as another input s and the generating the second container range information comprises performing the container range calculation using the existing feature information.

20. The method of claim 1, wherein the one or more fingerprints are stored in at least one of the at least one container, or a fingerprint catalog.

\* \* \* \* \*